United States Patent
Monsen

(10) Patent No.: US 7,751,372 B2
(45) Date of Patent: Jul. 6, 2010

(54) TECHNIQUE FOR ADAPTIVE DATA RATE COMMUNICATION OVER FADING DISPERSIVE CHANNELS

(76) Inventor: Peter Monsen, 370 Hollow View Rd., Stowe, VT (US) 05672

( * ) Notice: Subject to any disclaimer, the term of this patent is extended or adjusted under 35 U.S.C. 154(b) by 1005 days.

(21) Appl. No.: 11/499,174

(22) Filed: Aug. 4, 2006

(65) Prior Publication Data

US 2007/0147251 A1 Jun. 28, 2007

Related U.S. Application Data

(60) Provisional application No. 60/720,180, filed on Sep. 23, 2005.

(51) Int. Cl.
*H04B 7/216* (2006.01)
(52) U.S. Cl. .................. 370/335; 370/252; 370/235; 370/332; 375/267; 375/350
(58) Field of Classification Search .......... 370/227, 370/235, 282, 335, 332, 252; 375/267, 148, 375/343, 350
See application file for complete search history.

(56) References Cited

U.S. PATENT DOCUMENTS

| | | |
|---|---|---|
| 4,112,370 A | 9/1978 | Monsen |
| 4,328,585 A | 5/1982 | Monsen |
| 4,365,338 A | 12/1982 | McRae et al. |
| 4,644,562 A | 2/1987 | Kavehrad et al. |
| 5,220,320 A | 6/1993 | Assal et al. |
| 5,475,711 A | 12/1995 | Betts |
| 5,513,215 A | 4/1996 | Marchetto et al. |
| 5,541,955 A * | 7/1996 | Jacobsmeyer ............... 375/222 |

(Continued)

FOREIGN PATENT DOCUMENTS

EP 0 650 271 A2 4/1995

OTHER PUBLICATIONS

"Equalization Concepts for Alamouti's Space-Time Block Code," W.H. Gerstacker, F. Obernosterer, R. Schober, A.T. Lehmann, A. Lampe, and P. Gunreben, IEEE Transactions on Communications, vol. 52, No. 7, pp. 1178-1190, Jul. 2004.

(Continued)

*Primary Examiner*—Ricky Ngo
*Assistant Examiner*—Rasheed Gidado
(74) *Attorney, Agent, or Firm*—Edwards Angell Palmer & Dodge LLP; Peter J. Manus

(57) ABSTRACT

In a duplex radio link digital data information is transmitted to a remote terminal at a constant symbol rate in accordance with a selected data rate mode that is a function of direct sequence spreading gain, error correction code rate, and signal constellation type. The data rate is adapted by selecting a data rate mode that is a function of a data packet arrival rate and a link quality measure fed back from the remote terminal. The data packet arrival rate is controlled as a function of the link quality measure and the current data packet arrival rate. In systems with multiple transmit diversity channels, independent data is sent over each of the transmit diversity channels. In an idealized feedback communication example, a single antenna troposcatter system in a Ku-band application is shown to have 15.5 times the data rate capability of a conventional two-antenna system at S-band.

14 Claims, 8 Drawing Sheets

U.S. PATENT DOCUMENTS

| | | | |
|---|---|---|---|
| 5,563,610 | A | 10/1996 | Reudink |
| 5,590,399 | A | 12/1996 | Matsumoto et al. |
| 5,596,333 | A | 1/1997 | Bruckert |
| 5,619,503 | A | 4/1997 | Dent |
| 5,680,419 | A | 10/1997 | Bottomley |
| 5,736,959 | A | 4/1998 | Patterson et al. |
| 5,838,742 | A | 11/1998 | Abu-Dayya |
| 5,987,037 | A | 11/1999 | Gans |
| 5,999,563 | A | 12/1999 | Polley et al. |
| 6,157,811 | A | 12/2000 | Dent |
| 6,223,222 | B1 | 4/2001 | Fijolek et al. |
| 6,298,220 | B1 | 10/2001 | Barnhart et al. |
| 6,853,675 | B1 | 2/2005 | Oleynik |
| 7,336,727 | B2 | 2/2008 | Mukkavilli et al. |
| 2002/0196842 | A1 | 12/2002 | Onggosanusi et al. |
| 2004/0131038 | A1* | 7/2004 | Kim et al. ............... 370/342 |
| 2005/0047515 | A1 | 3/2005 | Walton et al. |
| 2005/0276317 | A1* | 12/2005 | Jeong et al. ............... 375/213 |
| 2006/0013328 | A1* | 1/2006 | Zhang et al. ............... 375/267 |

OTHER PUBLICATIONS

"Transmit Diversity and Linear and Decision-Feedback Equalizations for Frequency-Selective Fading Channels," L. Li, Y. Yao, and H. Li, IEEE Transactions on Vehicular Technology, vol. 52, No. 5, pp. 1217-1231, Sep. 2003.

"Dynamic Channel Assignment in High-Capacity Mobile Communications Systems", D.C. Cox and D.O. Reudink, The Bell System Technical Journal, vol. 50, No. 6, Jul.-Aug. 1971, pp. 1833-1857.

"Multiple Input/Multiple Output (MIMO) Equalization for Space-Time Block Coding," W. Choi and J.M. Cioffi, Proc IEEE Pacific Rim Conf. Communications, Computers, Signal Processing, pp. 341-344, 1999.

"Minimum Probability of Error for Asynchronous Gaussian Multiple-Access Channels", S. Verdu, IEEE Transactions on Information Theory, vol. IT-32, No. 1, Jan. 1986, pp. 85-96.

"Fast Computation of Channel-Estimate Based Equalizers in Packet Data Transmission," N. Al-Dhahir, J.M. Cioffi, IEEE Transactions on Signal Processing, vol. 43, No. 11, pp. 2462-2473, Nov. 1995.

"Decorrelatng Decision-Feedback Multiuser Detector for Synchronous Code-Division Multiple-Access Channel", A. Duel-Hallen, IEEE Transactions on Communications, vol. 41, No. 2, Feb. 1993, pp. 285-290.

"Adaptive Equalization of the Slow Fading Channel," P. Monsen, IEEE Transactions on Communications, vol. Com-22, No. 8, pp. 1064-1075, Aug. 1974.

"Tracking of Time-Varying Mobile Radio Channels—Part I: The Wiener LMS Algorithm", L. Lindbom, M. Sternad, and A. Ahlen, IEEE Transactions on Communications, vol. 49, No. 12, Dec. 2001, pp. 2207-2217.

"A Simple Transmit Diversity Technique for Wireless Communications," Siavash M. Alamouti, IEEE Journal on Select Areas in Communications, vol. 16, No. 8, pp. 1451-1458, Oct. 1998.

"Linear Multiuser Detectors for Synchronous Code-Division Multiple-Access Channels", R. Lupas and S. Verdu, IEEE Transactions on Information Theory, vol. 35, No. 1, Jan. 1989, pp. 123-136.

"An Adaptive Receiver for Digital Signalling Through Channels With Intersymbol Interference", J.G. Proaxis and J.H. Miller, IEEE Transactions on Information Theory, vol. IT-15, No. 4, Jul. 1969, pp. 484-497.

"Maximum-Likelihood Sequence Estimation of Digital Sequences in the Presence of Intersymbol Interference," G. David Forney, Jr., IEEE Transactions on Information Theory, vol. IT-18, No. 3, pp. 363-378, May 1972.

"Channel Equalization for Block Transmission Systems", G.K. Kaleh, IEEE Journal on Selected Areas in Communications, vol. 13, No. 1, Jan. 1995, pp. 110-121.

"Decision Feedback Equalization for CDMA in Indoor Wireless Communications", M. Abdulrahman, A.U.H. Sheikh, and D.D. Falconer, IEEE Journal on Selected Areas in Communications, vol. 12, No. 4, May 1994, pp. 698-706.

"Finite-Length MIMO Decision Feedback Equalization for Space-Time Block-Coded Signals Over Multipath-Fading Channels," N. Al-Dhahir, A.F. Naguib, and A.R. Calderbank, IEEE Transactions on Vehicular Technology, vol. 50, No. 4, pp. 1176-1182, Jul. 2001.

"Blind Multiuser Detection: A Subspace Approach", X. Wang and H.V. Poor, IEEE Transactions on Information Theory, vol. 44, No. 2, Mar. 1998, pp. 677-690.

"A Family of Multiuser Decision-Feedback Detectors for Asynchronous Code-Division Multiple-Access Channels", A. Duel-Hallen, IEEE Transactions on Communications, vol. 43, No. 2/3/4, Feb./Mar./Apr. 1995, pp. 421-434.

"Block Channel Equalization in the Presence of a Cochannel Interferent Signal", A. Ginesi, M. Vitetta, and D.D. Falconer, IEEE Journal on Selected Areas in Communications, vol. 17, No. 11, Nov. 1999, pp. 1853-1862.

"Performance Analysis of Minimum Variance CDMA Receivers", M.K. Tsatsanis and Z. Xu, IEEE Transactions on Signal Processing, vol. 46, No. 11, Nov. 1998, pp. 3014-3022.

"Information-Theoretic Considerations for Symmetric, Celllular, Multiple-Access Fading Channels—Part I", S. Shamai and A.D. Wyner, IEEE Transactions on Information Theory, vol. 43, No. 6, Nov. 1997, pp. 1877-1894.

"Feedback Equalization for Fading Dispersive Channels", P. Monsen, IEEE Transactions on Information Theory, Jan. 1971, pp. 56-64.

"On Multipath Channel Estimation for CDMA Systems Using Multiple Sensors", C. Sengupta, J.R. Cavallaro, and B. Aazhang, IEEE Transactions on Communications, vol. 49, No. 3, Mar. 2001, pp. 543-553.

"MMSE Decision-Feedback Equalizers: Finite-Length Results," N. Al-Dhahir and J.M. Cioffi, IEEE Transactions on Information Theory, vol. 41, No. 4, pp. 961-975, Jul. 1995.

"Performance Evaluation and Analysis of Space-Time Coding in Unequalized Multipath Fading Links," Y. Gong and K.B. Letaief, IEEE Transactions on Communications, vol. 48, No. 11, pp. 1778-1782, Nov. 2000.

Mobile Station-Base Station Compatibility Standard for Dual-Mode Wideband Spread Spectrum Cellular System, TIA/EIA/IS-95-A, 1992. (Abstract Only).

"Adaptive Space-Time Feedforward/Feedback Detection for High Data Rate CDMA in Frequency-Selective Fading", J.E. Smee and S.C. Schwartz, IEEE Transactions on Communications, vol. 49, No. 2, Feb. 2001, pp. 317-328.

"Adaptive Receiver Structures for Asynchronous CDMA Systems", P.B. Rapajic and B.S. Vucetic, IEEE Journal on Selected Areas in Communications, vol. 12, No. 4, May 1994, pp. 685-697.

"Megabit Digital Troposcatter Subsystem," C.J. Grzenda, D.R. Kern, and P. Monsen, Proc. Natl Telecommunication Conf., pp. 28-15 to 28-19, New Orleans LA, Dec. 1975.

"Adaptive Equalization and Interference Cancellation for Wireless Communication Systems", B.C.W. Lo and K.B. Letaief, IEEE Transactions on Communications, vol. 47, No. 4, Apr. 1999, pp. 538-545.

"MMSE Equalization of Interference on Fading Diversity Channels", P. Monsen, IEEE Transactions on Communications, vol. COM-32, No. 1, Jan. 1984, pp. 5-12.

"Blind Adaptive Multiuser Detection", M. Honig, U. Madhow, and S. Verdu, IEEE Transactions on Information Theory, vol. 41, No. 4, Jul. 1995, pp. 944-960.

"An Algorithm For Reducing the Bandwidth and Profile of a Sparse Matrix", N.E. Gibbs, W.G. Poole, Jr., and P.K. Stockmeyer, Siam J. Numer.Anal., vol. 13, No. 2, Apr. 1976, pp. 236-250.

Least Square Estimation With Application to Digital Signal Processing, A.A. Giordano and F.M. Hsu, John Wiley and Sons, New York, NY, 1985, Chapter 3.3.

Tropospheric Scatter Communications, P. Monsen, Wiley Encyclopedia of Telecommunications, John Wiley & Sons, New York, New York.

"Theoretical and Measured Performance of a DFE Modem on a Fading Multipath Channel," P. Monsen, IEEE Transactions on Communications, vol. COM-25, No. 10, Oct. 1977.

"5/15 GHZ Scattering Study," AD-A236 350, R. Crane, Rome Lab., Griffiss Air Force Base, NY 13441, May 1991.

"Coding for Channels with Feedback," J.M. Ooi, Kluwer Academic Publishers, Boston, MA 1998, p. 4, section 3.5.2.

* cited by examiner

TECHNIQUE FOR ADAPTIVE DATA RATE COMMUNICATION OVER FADING DISPERSIVE CHANNELS

CROSS REFERENCE TO RELATED APPLICATION

This application claims the benefit of U.S. provisional application Ser. No. 60/720,180 filed Sep. 23, 2005, which is incorporated herein by reference.

FIELD OF INVENTION

The present invention relates to data rate communication over duplex radio links containing fading channels that are dispersive in both time and frequency and, more particularly, to improvements in such communication in which feedback communications is used to adapt the transmitted data rate so as to maximize information throughput.

BACKGROUND OF THE INVENTION

Fading channels result from time-varying multipath reflections or scattering of a transmitted signal so that multiple signal versions with different delays, amplitudes, and phases arrive simultaneously at the receiver. Multipath amplitude and phase values combine at certain frequencies resulting in signal enhancement while at other frequencies cancellation occurs. Consequently the signal response across the frequency band is not constant as occurs when there is no multipath. The fading due to this effect is then described as frequency dispersive. In single carrier systems where data is sent in a serial stream of modulated symbols, the frequency dispersive fading in high data rate applications causes interference between symbols, i.e., intersymbol interference (ISI), that seriously degrades the bit-error rate if the ISI effect is not taken into account. The time variation of the multipath effects produces corresponding time variations in received signal strength. This aspect of fading is termed time dispersive. The time variation is unknown so that an adaptive receiver is required. Frequency and time dispersive fading are found in radio systems such as High Frequency (HF) ionospheric scatter, diffraction line-of-sight (LOS), mobile phone cellular, wireless local area network (WLAN), and tropospheric scatter. One type of protection against fading is accomplished by sending the same data on parallel channels that exhibit decorrelated fading. The parallel channels are called diversity channels and the number of available parallel channels is called the diversity order.

The channel multipath resulting in frequency dispersive fading produces in single carrier (SC) systems a form of redundant signal paths that fade independently. An adaptive equalizer can combine these redundant signal paths producing a form of implicit diversity protection against fading. The adaptive equalizer also minimizes the ISI resulting from the multipath. Consequently there is both an implicit diversity gain and an ISI penalty associated with these equalizer functions. In radio channel applications the ISI penalty is usually small and the performance of the equalizer is typically close to that of an ideal matched filter that coherently combines all the multipath contributions. Alternatively a multicarrier (MC) system often referred to as orthogonal frequency division multiplexing (OFDM) can achieve high data rates by apportioning the bits to be transmitted among a plurality of subcarriers each of which uses a symbol length that is long compared to the multipath delay spread. The small amount of ISI that results is eliminated by a time gate function. This gate function can be realized, for example, by sending no signal during the gate or by repeating previously transmitted data in a cyclic index technique. The MC technique is used in multiuser systems such as WLAN applications with one-to-many or many-to-one configurations. In radio systems where non-linear power amplifiers are used, there is a significant loss in MC systems associated with backing off the power amplifier by a peak-to-average ratio to ensure linear operation. The combination of the time gate loss and peak-to-average ratio in MC systems is significantly larger that the combination of ISI penalty and peak-to-average ratio loss in adaptive equalizer SC systems. Consequently in long distance radio applications adaptive equalized SC systems are preferred because power amplifier size and cost dominate the design choice. However, in indoor or short-distance WLAN applications OFDM is used because the adaptive equalizer and its associated complexity can be omitted and power amplifier limitations are not as important.

Tropospheric scatter (or "troposcatter") systems represent an important present application of duplex radio links containing fading dispersive channels. A troposcatter radio link exploits inhomogeneities in the troposphere resulting in scattered signals that can be received at distances beyond the radio horizon. The scatter mechanism is compensated by utilizing parallel transmission paths, i.e. diversity channels, which contain the same transmitted data but fade independently. Conventional systems would typically use quadruple diversity corresponding to a combination of dual transmit diversity using two separate frequency bands sending the same data on each of the frequency bands and dual receive diversity using two receiver antennas. Additional diversity provided by system design is termed explicit diversity as opposed to implicit diversity that results from channel multipath associated with the fading dispersive channel. Troposcatter systems may include multiple duplex links for purposes of providing digital data trunks containing digitized voice data and digital data including computer data and Internet traffic. These digital troposcatter systems are used in commercial applications, for example, for providing communication to oil drilling platforms at sea, and in military applications in both tactical and strategic configurations. Although many digital troposcatter systems were replaced by satellite technology in the 80's and 90's, the utility of rapid development of tactical systems and the cost and availability of satellite lease service are factors contributing to the continuing use of digital troposcatter systems. *Tropospheric Scatter Communications* by P. Monsen in Wiley Encyclopedia of Telecommunications, John Wiley & Sons, New York, N.Y., provides a summary and implementation considerations for this radio system technique.

In the 1970 time frame, adaptive equalization in single carrier systems was developed to combat the time-varying multipath effects associated with dispersive fading channels resulting in a data rate increase of about a factor of ten in digital troposcatter applications. This increase was due to the exploitation of the multipath in the form of implicit diversity channels as opposed to previous systems that attempted to minimize the multipath effects. An optimum infinite length decision-feedback equalizer (DFE) and a practical adaptive realization were described in *Feedback Equalization for Fading Dispersive Channels*, P. Monsen, IEEE Trans. on Information Theory, pp. 56-64, January 1971. A DFE modem based on these principles was developed and operated at a maximum data rate of 12.6 Mb/s in a 99% bandwidth of 15 MHz and was subsequently used in strategic troposcatter links. See C. J. Grzenda, D. R. Kern and P. Monsen, *Megabit Digital Troposcatter Subsystem*, (hereafter MDTS) NTC Conference Record, New Orleans, December 1975, pp. 28-15 to 28-19. Performance of a digital modem is typically characterized by an average bit-error rate as a function of a received signal-to-noise usually expressed as the ratio of average received energy per bit Eb to noise spectral density $N_0$. In channel simulator tests in a quadruple diversity configuration the DFE modem was shown to provide an average bit error rate of 1E-5 at an $E_b/N_0$ of 10 to 12 dB per diversity (16 to 18 total $E_b/N_0$) for 12.6 Mb/s over a multipath range of two-sigma values from 30 to 300 nanoseconds. See FIG. 4 in *Theoretical and Measured Performance of a DFE Modem on a Fading Multipath Channel*, P. Monsen, IEEE Trans. on Comm., October 1977. In the discussion to follow the mean $E_b/N_0$ per diversity value of 11 dB is used as a troposcatter link design objective.

In U.S. provisional patent application No. 60/653,225 Technique for Adaptive Equalization in Band-Limited High Data Rate Communication over Fading Dispersive Channels, (hereafter Adaptive Equalization and incorporated by reference) which provides a domestic priority for U.S. Ser. No. 11/348,816 file Feb. 6, 2006, now U.S. Pat. No. 7,590,204 issued Sep. 15, 2009, an optimum finite-length DFE is described for a spectrally efficient high data rate application. Rather than estimating the equalizer parameters as in MDTS, this DFE is adapted by estimating the channel using reference data that has been transmitted with digital data information and is locally available at the receiver. The DFE parameters are then computed directly from the channel parameters. With advances in technology and the optimum finite-length structure, a DFE modem based on the principles of Adaptive Equalization would be able to operate at higher data rates than MDTS under the same channel conditions.

Unfortunately the data rate of 12.6 Mb/s achieved in the 1970's in troposcatter systems has not been further improved with more powerful equalizers such as described in Adaptive Equalization because digital troposcatter systems are power limited. Existing systems use antennas and power amplifiers that are near practical limits for data rates on the order of 10 Mb/s. Troposcatter links are characterized by their annual median path loss L (50%) and a variable loss Y (q %) that accounts for variation in the hourly median values of path loss. The diurnal, monthly, and seasonal variations in received signal are an important characteristic of these radio links and results in a data rate limitation. *In Troposcatter Radio Links* (hereafter Radio Links), by G. Roda, Artech House, Boston, Mass. 1988, methods of prediction of troposcatter loss parameters are summarized. In one example in Table 6.2 of Radio Links, a 366.8 km path operating at 2.7 GHz is predicted to have a 214.4 annual median path loss. Troposcatter systems are commonly designed for an availability of q=99.9% corresponding to a worst case performance exceeded in only 8.76 hours of the year. Variability losses are detailed for different climate types in Fig. 6.3 of Radio Links. For a continental temperate climate (type 6) the variability loss for q=99.9% is seen to vary from 12 to 24 dB over a practical range of distances. Converting path loss into an $E_b/N_0$ per diversity value requires an additional calculation of gain loss resulting from the use of narrow beam antennas that illuminate only part of the useable scattering volume. Using Eq. 4.6 in Radio Links and a 99.9% value of 18 dB for variability loss from Fig. 6.3e, a calculation for a 12.6 Mb/s shows that a mean 11 dB $E_b/N_0$ per diversity can be achieved on this quadruple diversity 366.8 km path with two 8.5 meter antennas at each link end with each antenna at the link end having a power amplifier of 1.6 kw.

Because of limitation of available bandwidth in the S-band (1.55 to 5.2 GHz) region, the feasibility of utilizing frequencies in the Ku-band (10.9-17 Ghz) around 15 GHz for troposcatter communication has been under investigation. See *5-15 GHz Scattering Study*, AD A236 350, R. Crane, Rome Lab., NY 13441, May 1991. Because of the troposcatter power limitation as seen in the previous discussion, the advantages of additional bandwidth could not be used to significantly increase the data rate. Instead additional bandwidth could be used to increase the combination of explicit and implicit diversity either through frequency hopping or direct-sequence spreading of the transmitted signal. These techniques would lower the required $E_b/N_0$ by a few dB which could be used to offset transmission losses in this higher frequency band and/or reduce antenna/power amplifier parameters.

Although present troposcatter systems are considered to be power limited, information theory calculations show that this not need be the case. In the R=12.6 Mb/s example given above there are two transmitted frequency channels each occupying a bandwidth of 15 MHz. The 12.6 Mb/s is an uncoded system with a normalized information rate r=R/W=0.84 for each of the two transmit frequency channels. In the conventional diversity system the same data is transmitted on each of the two transmit frequency channels. With capacity-achieving codes one can send independent data on each of the two transmit frequency channels so the Shannon capacity formula for normalized capacity C/W is $$c = C/W = D_T \log_2(1+P/N_0 W) \quad (1)$$

where $D_T$ is the order of transmit diversity and P is the received signal power and $N_0$ is the noise spectral density. The ratio of energy per bit $E_b$ to noise spectral density is given by $$\frac{E_b}{N_0} = \frac{P}{RN_0} = \frac{P}{rN_0 W} \quad (2)$$

For a mean 11 dB $E_b/N_0$ per diversity in a 2S/2F configuration there is 14 dB $E_b/N_0$ available for each of the $D_T$=2 transmit channels. The signal-to-noise ratio per Hz (SNR/Hz) per transmit diversity for a rate of 0.84 is 13.2 dB and the normalized capacity from Eq.(1) is 8.92 bits/second/Hz, i.e. 10.6 times faster than the 1970's 12.6 Mb/s system. A troposcatter system operating at 134 Mb/s will certainly require more powerful equalization but signal processing power to realize such equalization has enormously increased in the last 30 years. According to Moore's law of doubling every 1.5 years the processing gain is a factor of $2^{20}$=1,048,576.

However the Shannon channel capacity applies to memoryless channels wherein received symbols have independent and identical statistics. A fading dispersive channel is not a memoryless channel due to frequency selective and time selective fading effects. Frequency selective fading produces multipath induced intersymbol interference (ISI) that causes the received symbols to be statistically dependent and not independent. Time selective fading produces correlation between received symbols. Fading dispersive channels can be converted into memoryless channels over an interval by using interleaving techniques but the associated delay is unacceptable in most practical applications.

A present or future radio system that includes fading dispersive channels will increasingly handle Internet Protocol (IP) traffic instead of a high speed digital data trunk containing a mixture of digitized voice and computer data. In previous systems the data rate associated with the digital data trunk was fixed so that if communication conditions improved there was no mechanism for exploiting the improved conditions.

Further as noted above previous systems commonly used a criterion of average bit error rate in the system design. The average would be taken over many fading intervals. Packets sent using Internet Protocol may be retransmitted if a certain quality level is not achieved. In voice IP transmissions (VOIP) the packets are not retransmitted but a certain quality level corresponding to the maximum number of error bits in the packet, i.e., an outage probability, is important. Consequently data rate throughput and outage probability are criteria of importance in the IP systems.

Fading dispersive channels in duplex (opposite directions simultaneously) applications are almost always not reciprocal, i.e., the channel conditions are not the same in both communication link directions. This lack of reciprocity arises from the need to separate transmit and receive frequencies at a single terminal end. Since transmission and reception is not on the same frequency, the frequency selective fading in the dispersive channel will preclude reciprocity.

Feedback communication can be used on communication links that are not reciprocal in order to relate back to the transmitter the quality of reception at the distant terminal. Practical feedback communication techniques must cope with transmission delay, time variation of the channel, error in quality assessment at the receiver, potential errors in the feedback message, and additional overhead to support quality assessment and the feedback message. Although it is well known that feedback communication does not increase the channel capacity on memoryless channels, one can construct examples of channels with memory whose capacity is increased by feedbacks, see *Coding for Channels with Feedback*, J. M. Ooi, Kluwer Academic Publishers, Boston, Mass. 1998, pg. 4 and section 3.5.2. Feedback communication using a return communications channel is commonly used in the initial selection of transmitted data rate as part of the establishment of a digital data channel. In U.S. Pat. No. 5,999,563, Rate Negotiation for Variable-Rate Digital Subscriber Line Signaling, the modem negotiates for a desired line transmission rate to accommodate line conditions. Protocol messaging is used to provide feedback communications and bandwidth selection in a cable application in U.S. Pat. No. 6,223,222, Method and System for Providing Quality-of-Service in a Data-over-Cable System with Protocol Messaging. Feedback communications to determine transmitted power levels are described in U.S. Pat. Nos. 6,853,675 and 6,298,220. In U.S. Pat. No. 5,475,711, System for Channel Capacity Modulation, the signal-to-noise ratio (SNR) is measured at the receiver, the SNR information is fed back to the transmitter on a return channel, and the bandwidth and maximum data rate are selected at the transmitter. In U.S. Pat. No. 5,541,955, Adaptive Data Rate Modem, the data rate is adapted in a Trellis code encoder that maintains a constant channel symbol rate and a single signal set. Soft decision matrices are used in the receiver to provide an estimate of the signal-to-noise ratio that is sent back to the transmitter via a return channel. By using a relatively large signal set for all data rates, this technique would be vulnerable to multipath induced intersymbol interference at lower transmission rates.

The above techniques also do not address how to exploit transmit and receive diversity channels in an adaptive data rate system. Moreover, the above techniques use signal-to-noise ratio as a quality measure that may be inadequate in large multipath environments where the positive (implicit diversity) and negative (intersymbol interference) effects of multipath contribute to the optimization of transmitted data rate.

SUMMARY OF THE INVENTION

Figure 1:
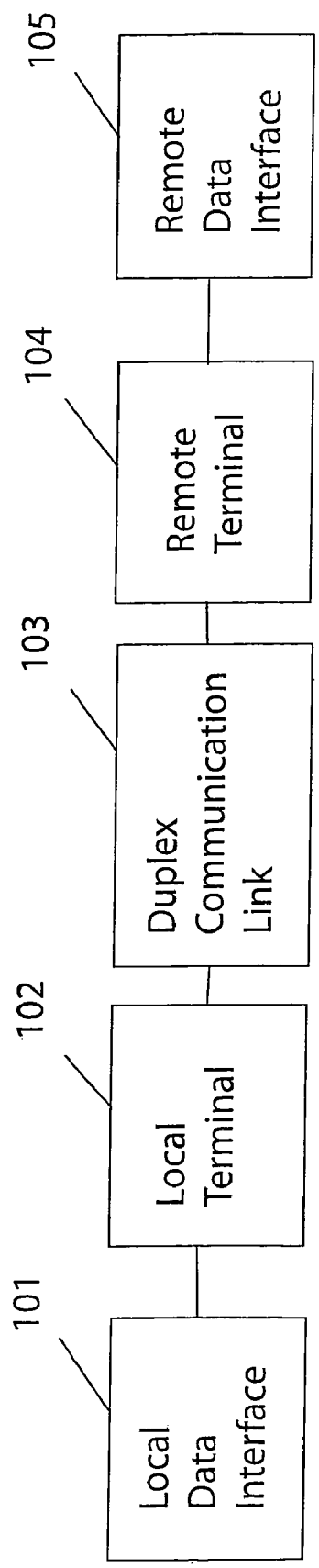
FIG. 1 is a block diagram of the duplex communication system.

It is the objective of the present invention to develop an adaptive data rate technique for a duplex radio link that will exploit improved transmission conditions through a combination of quality assessment of channel conditions, feedback communications, efficient utilization of diversity channels, and digital data flow control. It is also an objective of the present invention to develop a practical feedback communication technique that operates nearly as well as the zero delay, perfectly reliable, theoretical ideal feedback communications technique. It is the further objective of this invention to significantly increase the data throughput of IP traffic over a period of time including both short and long term fading effects.

Although the techniques in the present invention may be applied to any duplex link containing fading dispersive channels, the invention advantages are most easily illustrated in a tropospheric scatter application. Tropospheric scatter systems are power limited and the long distance character of these systems produces both short and long term signal variations each with large dynamic range. These systems also transmit high enough data rates, on the order of 10 Mb/s, so that the overhead associated with feedback communication is small.

In troposcatter systems the fading is due to forward scattering of the signal within a common volume defined by the scattering parameters and common antenna beam region. Because the scattering occurs at very small angles, there is little transfer of energy from one orthogonal polarization to another. This preservation of polarization orthogonality in a fading environment is a particular characteristic of tropospheric scatter and does not occur in other fading environments such as mobile cellular where large angle reflections occur. Since polarization orthogonality is preserved in troposcatter systems, it should be possible to approximately double the data rate by transmitting independent data on each of the orthogonal polarizations. This is not currently done in present troposcatter systems because orthogonal polarization is used to separate different spatial paths between antennas in order to maximize the diversity order. It is an object of this invention to utilize orthogonal polarizations for transmission of independent data and with adaptation of the data rate provide higher median data rate than present systems under the same signal strength conditions. It is a further objective of this invention to develop a Multiple-Input Multiple Output (MIMO) equalizer that will further increase achievable data rate by allowing the transmission of independent data from multiple antenna ports within the same frequency band and on the same polarization.

The short term fading component in tropospheric scatter systems have fade durations that are a fraction of a second that are compensated with diversity channels. The long term fading component has variations that are hourly, diurnal, monthly, and seasonal. In the past the long-term variations in these systems were compensated by designing the link for the worst few hours of the year. In past systems analog 4 kHz channels were frequency-division multiplexed and then digitized to produce a fixed transmission data rate. This fixed multiplex structure did not motivate adaptation of transmission parameters during times of stronger signals.

In the present invention the variable traffic loads associated with IP environment, the duplex nature of the radio link, diversity configuration, and the short and long term variations of link quality are factors that are utilized to greatly increases traffic flow over fading dispersive channels. In the invention a remote terminal measures the quality of the local-to-remote link component of the duplex communication link, transmits this quality information in a quality message sent back to a local terminal by feedback communications, and the local terminal adjusts its transmit data rate as a function of the input traffic load and the recovered quality message. The transmitted bit rate is held constant over a constant data rate (CDR) interval and is reset according to a selected data rate mode at the beginning of each CDR interval. In the preferred embodiment the input traffic load is characterized by the arrival rate of data packets. The local terminal also provides commands across the data interface to control the traffic load as a function of the communication link data rate capabilities and the current traffic load. Controlling of the traffic load in the preferred embodiment is accomplished by lowering the data packet arrival rate by sending pause commands from the local terminal to the data interface.

In the preferred embodiment the link quality measurement is accomplished by correlating reference data and the received signal associated with a fading dispersive channel to provide channel estimates of multipath components. The sum of the magnitude-squared channel estimates appropriately normalized by the additive noise level is a quality measure of the associated fading dispersive channel because it represents the total signal-to-noise ratio. Even when there is a large amount of multipath, DFE technology such as described in Adaptive Equalization can efficiently exploit virtually all the multipath components with small ISI penalty so that total received signal energy can be used as a quality component. The resulting link quality measure is converted into a feedback message that is transmitted along with the coded/interleaved digital data information.

In addition to transmission of digital data information, reference data for aid in receiver processing is also transmitted. Transmitted reference data is known at the receiver so that at the receiver it can be generated for receiver processing. In a preferred embodiment feedback messages are transmitted by replacing modulation symbols that are associated with reference data. In the present invention transmit diversity channels that are orthogonal or almost orthogonal each contain independent digital data transmitted with a selected data rate mode. Receive diversities in the present invention are combined and the effect of this combination is included in the data rate adaptation. While the use of orthogonal transit diversity channels result in an additive increase in capacity as shown above, capacity can also be increased in a Multiple-Input Multiple-Output (MIMO) system by transmitting independent data on transmit diversity channels that share the same frequency band and orthogonalization. A modification to the high data rate channel-estimating DFE described in Adaptive Equalization is developed herein for this MIMO application. The MIMO DFE additionally mitigates the mutual interference produced by the multipath when independent data is sent on nonorthogonal, i.e. MIMO, transmit diversity channels.

The reference data and digital data information are modulated in accordance with a selected data rate mode that is a function of direct sequence spreading gain, N, error correction code rate, $r_c$, and signal constellation size, M. In a preferred embodiment reference data is time-division multiplexed with digital data information after it has been error-corrected coded and interleaved. The resulting modulation symbols depend on the signal constellation type, e.g. for Quadrature-Phase-Shift Keying (QPSK) the symbol set is $\exp(j\pi n/2 + j\pi/4)$, n=0,1,2,3. The modulation symbols are then multiplied by a direct-sequence spreading pattern to produce symbols for transmission. The transmitted signal uses the same symbol rate (1/T) for all data rate modes so as to maintain a constant bandwidth and to facilitate receiver processing. For lower data rate modes where N>1, the symbol corresponds to a chip symbol such that there are N chip symbols per modulation symbol. In these modes the constellation type corresponds to QPSK (also called MPSK with M=4). In higher data rate modes where N=1, i.e. there is no direct-sequence spread spectrum gain, there are $\log_2 M$ coded bits per modulation symbol and this is also the symbol to be transmitted. With the peak power constraint of nonlinear amplifiers the selected modulation is MPSK for M=4 and 8 and M-ary Quadrature Amplitude Modulation (MQAM) for $M \geq 16$.

A preferred single antenna embodiment of the present invention for a duplex troposcatter link employs symmetrical link terminals each with a single antenna reflector with multiple feedhorns. Each feedhorn has an associated duplexer for transmitting and receiving signals. For example, in a practical dual angle/dual polarization (2A/2P) diversity troposcatter system, independent data is modulated, amplified, and then transmitted on each of two orthogonal polarizations each associated with one of the two vertically-stacked feedhorns. For transmission the two vertically-stacked feedhorns are orthogonl polarized, e.g. horizontal polarization on the lower feedhorn and vertical polarization on the upper feedhorn. In this example for each of the two independent data transmit diversities an adaptive receiver combines two receiver diversities associated with the two receiver feedhorns. For reception of two approximately orthogonal transmit diversities each feedhorn must be dual polarized, i.e. reception on both polarizations is enabled. A transmit diversity quality measure, for example from the measured channel response, is determined and sent back to a local terminal by feedback communications. The recovered quality measure is used at the local terminal to adapt the data rate of the respective transmit diversity. In a subsequent adaptive data rate example comparing an S-band two antenna terminal with the single antenna angle diversity system at Ku-band, the latter was found to have a significantly larger average data rate capability.

DETAILED DESCRIPTION OF THE INVENTION

A digital communication link that provides information transfer in both directions, i.e. duplex communication, connects two link end points each with digital data information sources and collectors. In FIG. 1 a local data interface 101 is used at the local end point as the combination source and collector of digital data information. Typically local data interface 101 contains Internet Protocol (IP) traffic in the form of packets that came from or are going to servers that provide connection to the Internet. Local terminal 102 accepts digital data information from local data interface 101 for transmission over the duplex communication link 103 to a remote terminal 104 at the remote end point of communication link 103. Remote terminal 104 recovers the transmitted digital data information from received signals that include channel distortions and noise introduced in communication link 103. The recovered digital data information is transferred to remote data interface 105 where in an IP application it is subsequently passed on to the servers (not shown). Because of the duplex communication feature there is duplex functional symmetry so the transmission functions described above at the local end are duplicated at the remote end and the reception functions described above at the remote end are duplicated at the local end. Although there is duplex functional symmetry, the local and remote terminals may differ in structure and data rate capability to support asymmetrical communication requirements.

The duplex communication link 103 includes a plurality of fading dispersive channels. The channels are dispersive in time, i.e. fading changes with time, and are dispersive in frequency, i.e. fading varies with respect to frequency in the utilized bandwidth. A plurality of channels in a diversity configuration is used to combat the fading effects. The number of channels in one direction to provide fading protection through redundancy is called the diversity order. In conventional systems the duplex communication links include D tropospheric scatter channels in each direction between the local and remote end points. These diversity channels are divided between transmit diversity channels of order $D_T$ and receive diversity channels of order $D_R$. In order to realize fading protection, conventional systems transmit the same i.e., redundant, data on each of the transmit diversity channels. In the present invention receive diversities associated with each transmit diversity are adaptively combined and feedback communications provides a quality measure of each transmit diversity. Rather than send the same data on each transmit diversity, the quality measures are used to select a data rate for independent data sent on each transmit diversity. A capacity analysis is presented subsequently to justify the use of independent data on each transmit diversity rather than adapting the data rate on a composite transmit/receive diversity configuration with redundant data at the same data rate on each transmit diversity.

Figure 2:
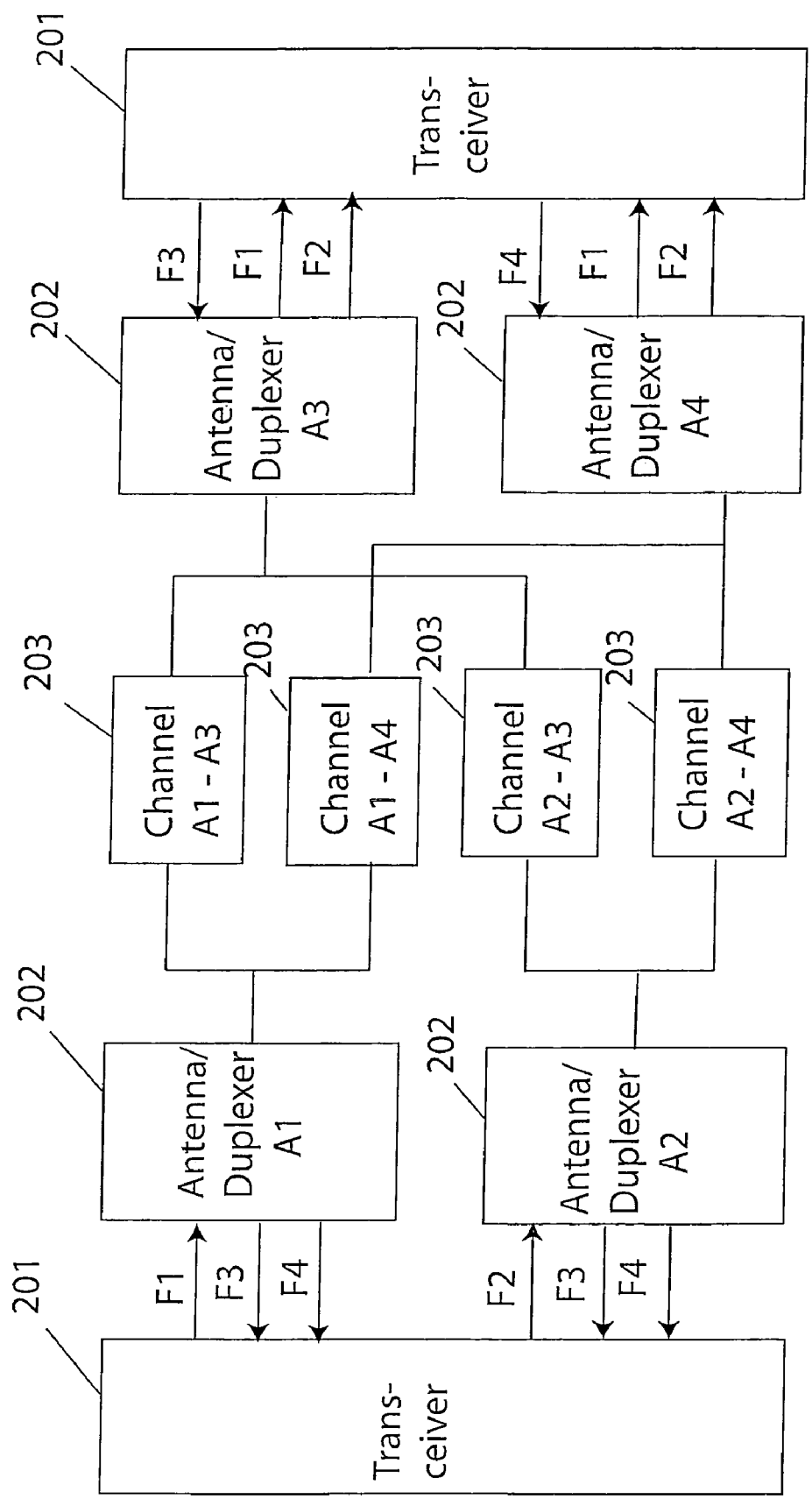
FIG. 2 is a block diagram of the terminals and a quadruple diversity communication link of FIG. 1.

The most common tropospheric scatter configurations are quadruple and dual diversity. A quadruple diversity system is illustrated in FIG. 2. In this example local terminal 102 of FIG. 1 is shown in FIG. 2 to include transceiver 201 and two antenna/duplexer units 202. The duplex communication link 103 of FIG. 1 is shown in FIG. 2 to include four troposcatter channels 203 that connect with the antenna/duplexer units 202 in the local terminal and the antenna/duplexer units 202 in the remote terminal. Conventional quadruple diversity systems use either different frequency bands or orthogonal polarizations to separate signals. In both cases there are two antennas at each end point, i.e. a dual space (2S) configuration. Thus the quadruple diversity system with dual frequency diversity (2F) is denoted as 2S/2F diversity. When polarization discrimination is used the quadruple diversity results from four separate space paths between antennas so this diversity configuration is termed 4S diversity. Because the fading in troposcatter systems is due to small angle scattering, polarization orthogonality is mostly preserved. Consequently orthogonal polarization correlation is nearly unity and the 4S diversity protection results from the four spatially separate scattering volumes and not from the orthogonal polarizations. For both 2S/2F and 4S diversity, there are $D_T=2$ transmit diversities and $D_R=2$ receive diversities. In FIG. 2 for a 2S/2F configuration at the local terminal the antenna/duplexer units 202 are designated A1 and A2 with A1 transmitting on frequency F1, A2 transmitting on frequency F2, and both A1 and A2 receiving on frequencies F3 and F4. Transceiver 201 at the local terminal receives four diversity signals (F3,A1), (F4, A1), (F3,A2), and (F4,A2). In the 2S/2F configuration the antenna/duplexer exploits the frequency band difference for signal separation, e.g., F1, F2, F3, and F4 are separate signal bands. In the 4S configuration F3 and F4 are on the same frequency but orthogonal polarizations so they can be separated in antenna/duplexer 202. F1 and F2 are also same frequency/orthogonal polarized.

These diversity channels provide protection in this fading dispersive channel application because when there is a fade in one diversity channel at a certain time and a certain part of the signal band it is unlikely that another diversity channel will also have a fade at that time and signal subband.

In general, in radio communication applications, the requirement to separate the high power transmissions from low power receptions requires different frequency bands for transmission and reception. For example, in FIG. 2 the transmit frequency band is always different than the receiving bands. Consequently when frequency dispersion produces fading within the signal bandwidth, it is guaranteed that different frequency bands will be uncorrelated. This is good for diversity reception but it also means that the quality of the local-to-remote path cannot be obtained by reciprocity by measuring received signal characteristics at the local terminal. Because of the lack of reciprocity in the fading dispersive channel applications, feedback communications is required if adaptation of transmit parameters in response to channel change is to be realized.

In the present invention the variable traffic loads associated with IP environment, the duplex nature of the communication link, diversity configuration, and the short and long term variations of link quality are exploited in order to greatly increase traffic flow over fading dispersive channels. In the invention the remote terminal measures the quality of the local-to-remote link, transmits this quality information in a quality message sent back to the local terminal by feedback communications, and the local terminal adjusts its transmit data rate as a function of the input traffic load and the recovered quality message. The transmitted bit rate is held constant over a constant data rate (CDR) interval and is reset according to a selected data rate mode at the beginning of each CDR interval. The local terminal also provides commands across the data interface to better match the communication link data rate capabilities and the IP traffic load.

Figure 3:
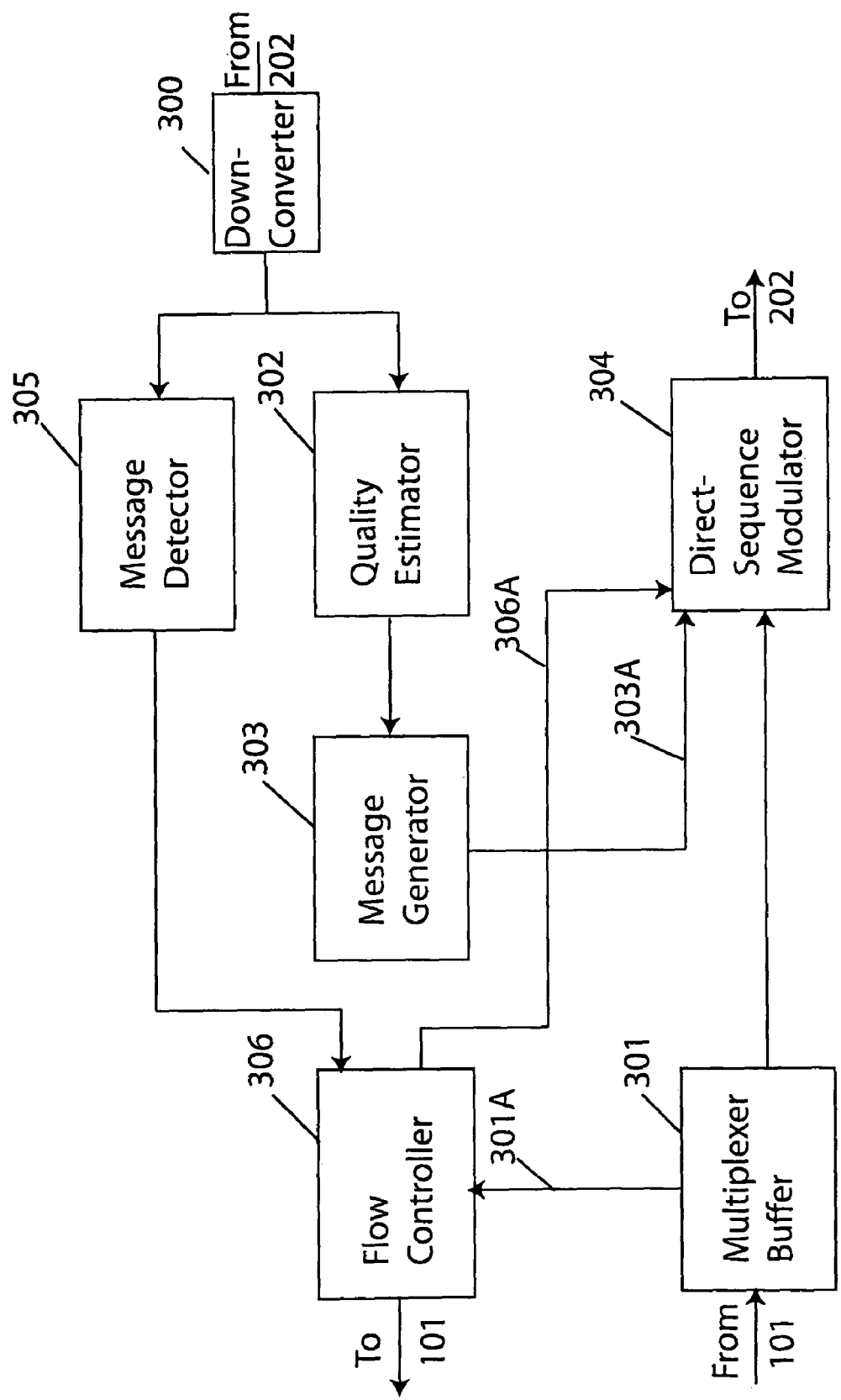
FIG. 3 is a block diagram of the data interface of FIG. 1 and the transceiver of FIG. 2.

The data interface in FIG. 1 and the transceiver 201 in FIG. 2 are shown in FIG. 3. A multiplex buffer 301 accepts digital data information from data interface 101. The multiplex buffer 301 measures a buffer occupancy factor that is related to the relative fullness of the buffer. The multiplex buffer 301 outputs bits of digital data information for transmission in the CDR interval. In the preferred embodiment the transceiver digital data is sent and received in data frames and the CDR interval corresponds to an integer number of data frames, i.e. a CDR frame. This arrangement allows adaptive equalization, as described in Adaptive Equalization for example, to be performed independently on a data frame basis. Interleaving over a CDR frame then provides protection against variations in data frame equalization within the CDR frame. The buffer output bits in the CDR frame are provided to Direct-Sequence (DS) modulator 304 where they are modulated for transmission toward the remote terminal. Digital data information is allocated into independent data streams that are transmitted on each of the $D_T$ transmit diversities. The number of bits transmitted for each transmit diversity in a CDR frame depends on a selected data rate mode that is a function of direct sequence spreading gain, error correction code rate, and signal constellation type. Direct-Sequence (DS) modulator 304 produces DT outputs each with a constant symbol rate but with different modulation parameters and data rate. The data symbol rate is equal to the constant symbol rate for high data rate modes and in lower data rate modes DS spreading is used to produce a data symbol rate that is a submultiple of the constant symbol rate. By maintaining a constant symbol rate, transmitted signals always occupy the same bandwidth and for the receiver function, the input sampling rate can be fixed.

At the local terminal received signals associated with each of the receive diversity channels and containing digital data information sent from the remote terminal on a particular transmit diversity path are provided from duplexer 202 to down-converter 300 where signals are converted from radio frequencies to baseband, time sampled, and digitized for signal processing. The received signals are sampled at an integer multiple, greater than one, of the data symbol rate to provide received vectors within a receiver time block that has a time duration that is no more than one-half of the interleaving delay. The received vectors generated in down-converter 300 are passed to message detector 305 where transmitted digital data information and feedback message information are recovered. In the preferred embodiment message detector 305 contains the channel-estimator/decision-feedback equalizer (CE/DFE) described in Adaptive Equalization when transmit diversity channels are orthogonal and a modified version of CE/DFE to be described subsequently for nonorthogonal transmit diversity channels.

Processed signals from the CE/DFE are provided on 305A to quality estimator 302 for generating the channel estimates used in the DFE and for computing the quality estimates. Since independent data is transmitted on multiple transmit diversities, quality estimator 302 computes a remote-local quality measure for each of the transmit diversities that includes the combining of the receive diversity channels. There are numerous ways to generate a quality measure for each transmit diversity path including but not limited to (1) measuring receive power by correlating with reference data, (2) exploiting adaptive equalizer parameters that depend on the minimum mean-square error, (3) blind estimation techniques that do not require reference data, (4) mean-square error measurements after adaptive equalization, and (5) bit-error rate measurements from either encoded reference data or data that has been FEC encoded again after decoding. The frequency dispersive nature of the channel spreads the energy in a delay dimension. This multipath delay effect improves receiver processing by exploiting the fact that the entire frequency band does not simultaneously fade. Since this improvement is implicitly available as part of the channel, it is termed implicit diversity to distinguish it from the explicit diversity associated with redundant space or frequency channels. Consequently a quality measure is more precise if it includes the effects of both the explicit and implicit diversity improvements. It is also desirable to generate the quality estimate on a processed version of the received signal rather than on demodulated or decoded signals to avoid processing delays.

Accordingly in the preferred embodiment a received energy calculation is used that takes into account the channel multipath. This is accomplished in quality estimator 302 by estimating sample values of the receiver-diversity combined channel impulse response of each of the transmit diversity paths. The total received energy for a transmit diversity path is the sum of the magnitude squared of all of the received channel impulse response values associated with that transmit diversity path. In the CE/DFE described in Adaptive Equalization, the degradation due to intersymbol processing is small and almost all the received energy is effectively utilized in the equalization process. Bit-error-rate performance is then closely related to total received energy. When the transmit diversities are not orthogonal some of the received energy is used for interference reduction and a subset of the channel multipath energy is used for the quality estimate. Because of the large dynamic range required in transceivers in these applications, a transceiver Automatic Gain Control (AGC) that is the same for each diversity channel may be used to adjust the received signal levels at Analog/Digital (A/D) interfaces. Also long term variations in atmospheric noise levels may be monitored or measured. The resulting quality measure is then a signal-to-noise (SNR) derived from received multipath energy adjusted for the AGC level and normalized by the additive noise level The transmit diversity remote-local quality measures are provided to message generator 303 where they are converted into a local-to-remote feedback message. Message generator 303 produces a feedback message associated with each remote terminal transmit diversity. The feedback messages are provided to DS modulator 304 for transmission. This transmission may be achieved in a various ways. For example, DS modulator 304 may transmit feedback messages on a separate pilot channel or multiplex the feedback messages with coded/interleaved digital data information. In the preferred embodiment modulation symbols associated with reference data are replaced with coded feedback symbols containing the feedback message.

The transceiver 201 in the local and remote terminals operates in the same manner in this duplex communication application. The received signals at local terminal 102 of FIG. 1 then contain quality messages from remote terminal 104 indicating the local-to-remote link quality for each local terminal transmit diversity. Message detector 305 in FIG. 3 includes a demodulator that processes the received signals to recover these quality messages. The demodulator may contain for example the CE/DFE described in Adaptive Equalization. The demodulator processes the received signals to recover the transmitted digital data information. Message detector 305 further includes a subset of such a demodulator that specifically extracts feedback messages. Message detector 305 passes the local-to-remote link quality measures to flow controller 306. In flow controller 306 the link quality measures and buffer occupancy factor supplied on 301A from multiplex buffer 301 are combined to select the data rate modes for each transmit diversity for the next CDR frame and, if necessary to issue variable data rate commands to the data interface to control the traffic load. Controlling of the traffic load in the preferred embodiment is accomplished by lowering the data packet arrival rate by sending pause commands from the local terminal to the data interface. A pause command is defined in IEEE Standard 802.3x with respect to a 100 Mbps full duplex Ethernet. The pause command corresponds to a minimum length packet telling the data interface to stop sending traffic for an amount of time equal to $N_F \times T_F$ where $N_F$ is a 16 bit number and $T_F$ is the time duration equivalent to 512 bit times. The arrival rate of data packets can be lowered, maintained, or raised by using these pause commands in conjunction with monitoring the occupancy level of multiplex buffer 301.

The choice to send the same data or independent data on each of the transmit diversity channels was made based on the Shannon capacity formula, Eq. (1). The normalized capacity c is a concave function of the x=SNR/Hz variable, i.e. the slope of c(x) is monotonically decreasing. A property of concave functions is that $$c(x_1)+c(x_2) \geq c(x_1+x_2)$$

If the same data rate is sent on two orthogonal transmit diversities with SNR values $x_1$ and $x_2$, the SNR values add and the resulting capacity is $c(x_1+x_2)$. When independent data is sent on each of two orthogonal diversities the capacities add to give $c(x_1)+c(x_2)$. The concave inequality says that as coding/modulation techniques approach capacity, it is better to send independent data on each of the transmit diversities. This conclusion assumes that the transmit diversities maintain their orthogonality in the presence of fading. Frequency diversity uses separate frequency bands that satisfy this orthogonality condition. In troposcatter systems orthogonality polarized channels maintain their orthogonality in the forward scatter fading process.

This result supporting independent data transmission on transmit diversity channels is based on the concave capacity function and applies to the present invention where the data rate is adapted to the channel condition. Conventionally without data rate adaptation it was better to maximize diversity by sending the same data on two transmit diversities so that quadruple diversity could be realized at a symmetrical receiver location. Without adaptive data rate adaptation, quadruple diversity with redundant dual transmit diversity at a fixed data rate is better than the same fixed data rate with dual diversity plus an additional 3 dB due to transmitting half the fixed data rate on each of the two transmit diversities. Thus in conventional systems maximizing the total diversity by sending the same data at a fixed data rate on each transmit diversity channel leads to a lower bit-error rate result. Thus conventionally polarization orthogonality has not been exploited in troposcatter systems to increase the data rate but to discriminate between receiver diversities so as to maximize the diversity order.

While the use of orthogonal transit diversity channels results in an additive increase in capacity as shown above, capacity can also be increased by transmitting independent data on transmit diversity channels that share the same frequency band and orthogonalization. The resulting increase in capacity is due to the fading multipath environment between multiple input-multiple output (MIMO) antenna ports. In the article *On the Capacity of Radio Communication Systems with Diversity in a Rayleigh Fading Environment*, J. Winters, IEEE J. Select Areas Commun., pp. 871-878, June 1987, the use of multiple antenna paths to increase spectral efficiency in fading radio channels was initially investigated. The capacity of those MIMO channels was evaluated in *Capacity Limits of MIMO Channels*, A. Goldsmith, et. al., IEEE J. Select. Areas Commun., pp. 684-702, June 2003, where explicit formulas for capacity are developed for flat fading radio channels. In general the capacity scales linearly with min($D_T, D_R$) relative to a single antenna port at each terminal end.

In the present invention the data rate is adapted as described above for each of the transmit diversities. Thus in a symmetrical link configuration with $D_T$ transmit diversities with independent data the quality estimator 302, message generator 303, message detector 305, and DS modulator 304 duplicate their functions for each of the $D_T$ transmit diversities. DS modulator 304 assigns data for transmission over the $D_T$ transmit diversities in accordance with flow controller 306 allocations.

In any feedback communication system there is a time delay between the reception of digital data information at the remote terminal and adaptation at the local terminal transmitter. This delay is due to the quality measurement time at the receiver, the feedback message duration, the transmission delay of the feedback communication, and framing delay associated with the parameter change. In order to insure correct parameter adaptation it is desirable that the quality is measured with high accuracy and that the quality feedback message is recovered reliably. This can be accomplished by measuring the quality over a duration containing many data symbols and constructing a feedback message with a large message-to-noise ratio. Accordingly the preferred embodiment measures the quality over one CDR frame and the quality message consists of a small number of bits that are encoded and transmitted by multiple symbols within the CDR frame. When the feedback message is read at message detector 305, the transmission data rate is not adapted until the beginning of the next CDR frame which results in a framing delay.

Figure 4:
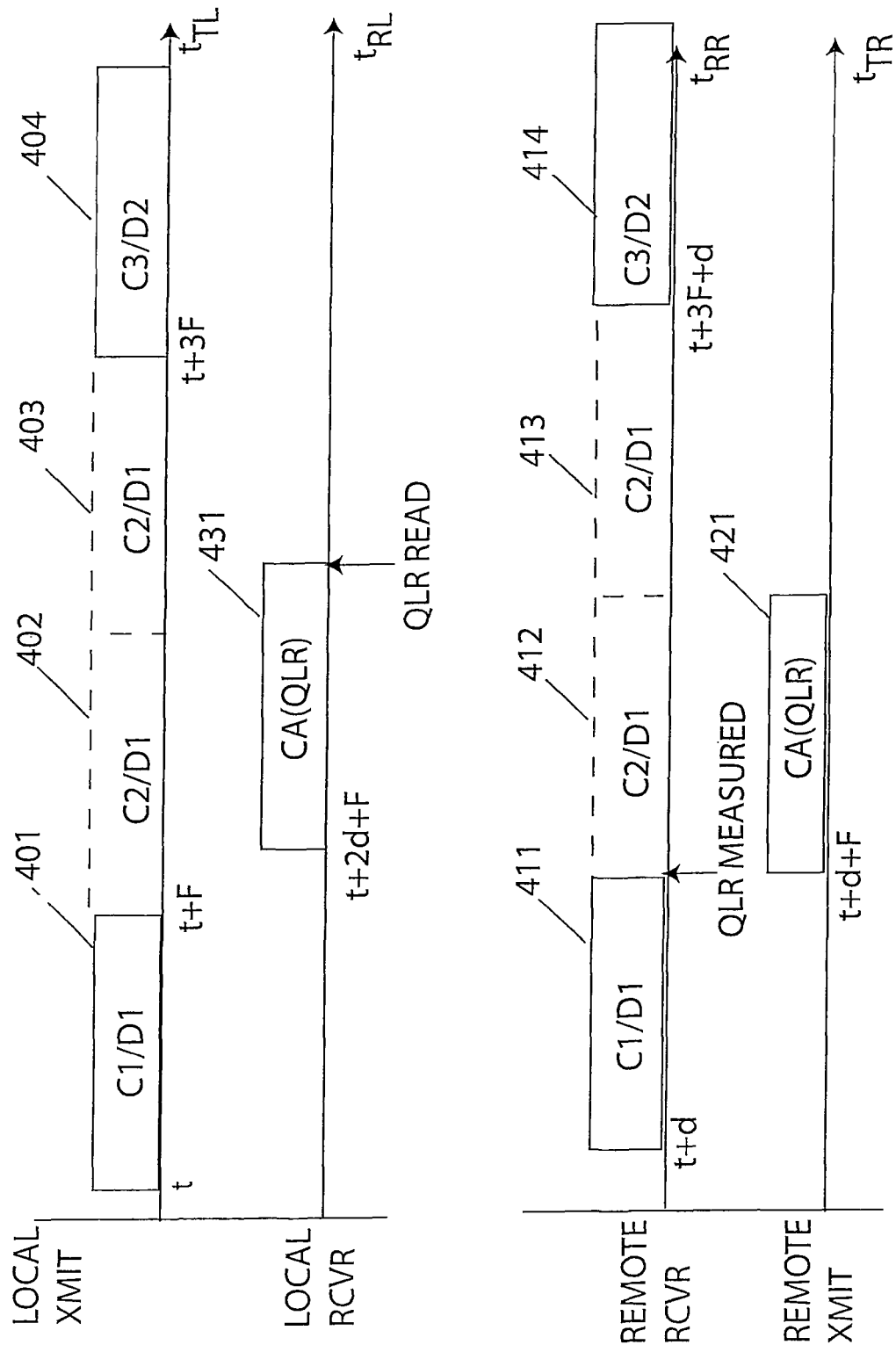
FIG. 4 is a timing diagram of signals in the communication system of FIG. 1.

FIG. 4 illustrates the delay effects by showing the transmitted and received CDR frames as a function of time and location. At the local transmitter a CDR frame 401 denoted C1 with data rate D1 and duration F seconds is transmitted toward the remote terminal at time t. The received CDR frame 411 at the remote receiver begins at time t+d where d is the transmission delay. Quality measure requires the duration of a CDR frame so that at time t+d+F, the local-to-remote quality measure (QLR) is available and is transmitted back toward the local terminal in CDR frame CA 421 at that time. The quality message cannot be completely read until received CDR frame CA 431 is completely received at time t+2d+2F. In most applications d<<F so that t+2d+2F<t+3F and a change in data rate from D1 to D2 can be implemented, if required, starting with the $3^{rd}$ CDR frame C3/D2 404. The CDR frame C3/D2 404 contains a new data rate message in the early part of the CDR frame. At the remote receiver this CDR frame C3/D2 414 arrives at t+3F+d and received signals are stored as part of the detection process while message detector 305 looks for a change of data rate message. After a duration that is short compared to the CDR frame duration F, recovery of digital data from CDR frame C3/D2 414 at the remote receiver begins using the previous data rate if no new data rate message is found or at the new data rate read by message detector 305.

The data rate in the transceiver is changed by changing the forward-error-correction (FEC) code rate, changing the Direct-Sequence (DS) processing gain equal to the number N of symbols per data symbol, and changing the signal constellation type. Although the transmitted data rate is changed, the transmitted symbol maintains the same period T. Table 1 provides an example of data rate modes in the present invention adaptive data rate system with a factor of 9 N from the lowest to the highest data rate. In this example the DS modulator 304 includes a square-root raised cosine filter with roll-off factor f=0.5 that produces an occupied bandwidth of W=(1+f)/T. With MPSK, M=4,8 and MQAM, M≧16 there are $\log_2 M$ bits per symbol and with a code rate $r_c$ the transmitted rate R is $r_c \log_2 M/T$ bits/second. The normalized information rate is then $$r=R/W=r_c \log_2 M/(1+f) \qquad (3)$$

DS spreading is considered here as a trivial form of coding wherein the code rate for the DS function is 1/N where N is the spreading factor. Although DS spreading provides no coding gain it does decrease the required signal-to-noise ratio per Hz (SNR/Hz) because the data rate is decreased proportionally. A convenient implementation is to choose values of N as powers of two, e.g. $N=2^m$, $m=1,2,3,4,5$.

TABLE 1

Data Rate Modes, Roll-Off = 0.5, BER = 1E – 5
Spreading Gain = S(N) = 10 $\log_{10}$(N)

| Constellation | Code Rate | Info. Rate, r b/s/Hz | $y = E_b/N_0$ dB | $x = P/N_0W$ dB |
|---|---|---|---|---|
| 4 PSK/DS(N) | 1/3N | 4/9N | 1.5 | −2.02-S(N) |
| 4 PSK | 1/3 | 4/9 | 1.5 | −2.02 |
| 4 PSK | 1/2 | 2/3 | 2.1 | 0.34 |
| 4 PSK | 2/3 | 8/9 | 3.4 | 2.89 |
| 4 PSK | 3/4 | 1.0 | 4.0 | 4.0 |
| 4 PSK | 7/8 | 1.167 | 5.5 | 6.2 |
| 4 PSK | 1 | 1.333 | 9.6 | 10.9 |
| 9 PSK | 1 | 2.0 | 14.9 | 17.9 |
| 16 QAM | 1 | 2.666 | 19.1 | 23.4 |
| 32 QAM | 1 | 3.333 | 21.9 | 27.1 |

Table 1 also includes the required ratio of bit-energy (Eb) to noise spectral density ($N_0$) for a bit-error rate (BER) of 1.E-5 for practical forward-error correction (FEC) turbo-code implementations. The last column converts $E_b/N_0$ into the normalized signal-to-noise ratio SNR/Hz=$P/N_0W$ (see Eq. 2) where P is the received power. The $P/N_0W$ column provides threshold levels where the data rate would be dropped to the next lower level In the above example with a maximum spreading factor of N=32, no data would be transmitted when the SNR/Hz drops below −17.1 dB. Analysis of achievable average data rate for troposcatter examples show little added advantage for constellation sizes larger than M=32.

In a present troposcatter application larger bandwidths than 15 MHz may be available particularly in Ku band (10.9-17 Ghz). Additionally, present techniques improve spectrum efficiency using square-root raised cosine filters with roll-off factors on the order of 0.5. For an example of the present invention application, a tropospheric scatter system design is given with a maximum data rate of 360 Mb/s operating in an allocated bandwidth of 54 Mhz for each of two transmit diversities. The diversity configuration corresponds to the conventional quadruple diversity dual-space/dual frequency (2S/2F) combination with two transmit frequency diversities and two receive space diversities. In the present invention an independent data stream is transmitted on each transmit diversity channel. A constant symbol rate of 36 MHz is chosen so that for the roll-off example of 50% the allocated bandwidth of 54 MHz is realized on each transmit diversity channel. The data rates for each of the two transmit diversity channels are computed from Table 1 above. At a lowest data rate of 0.75 Mb/s, a code rate of ⅓ N is used to produce an FEC coded rate of 2.25 Mb/s followed by a DS modulation using N=32 chips per bit to provide 72E6 chips/second (72 Mc/s). Since FEC coding gain is a more effective way of spreading than DS modulation, the latter is sacrificed first as data rate is increased until the N=1 mode in Table 1 at 24 Mb/s which has only FEC coding. The data rate is further increased in eight additional steps to reach the 32QAM mode with data rate of 180 Mb/s per transmit diversity, for a maximum data rate of 360 Mb/s.

The size of a coded data block transmitted in a CDR frame with a duration of 0.004 second is equal to 9000 coded bits at the lowest data rate and 720E3 coded bits at the largest data rate. This block size does not include message bits for the feedback message nor does it include the known bits. i.e., reference bits, that may be used for receiver processing. In most applications the feedback communications delay of three CDR frames (see FIG. 4 example) will be much shorter than the channel decorrelation time.

Figure 5:
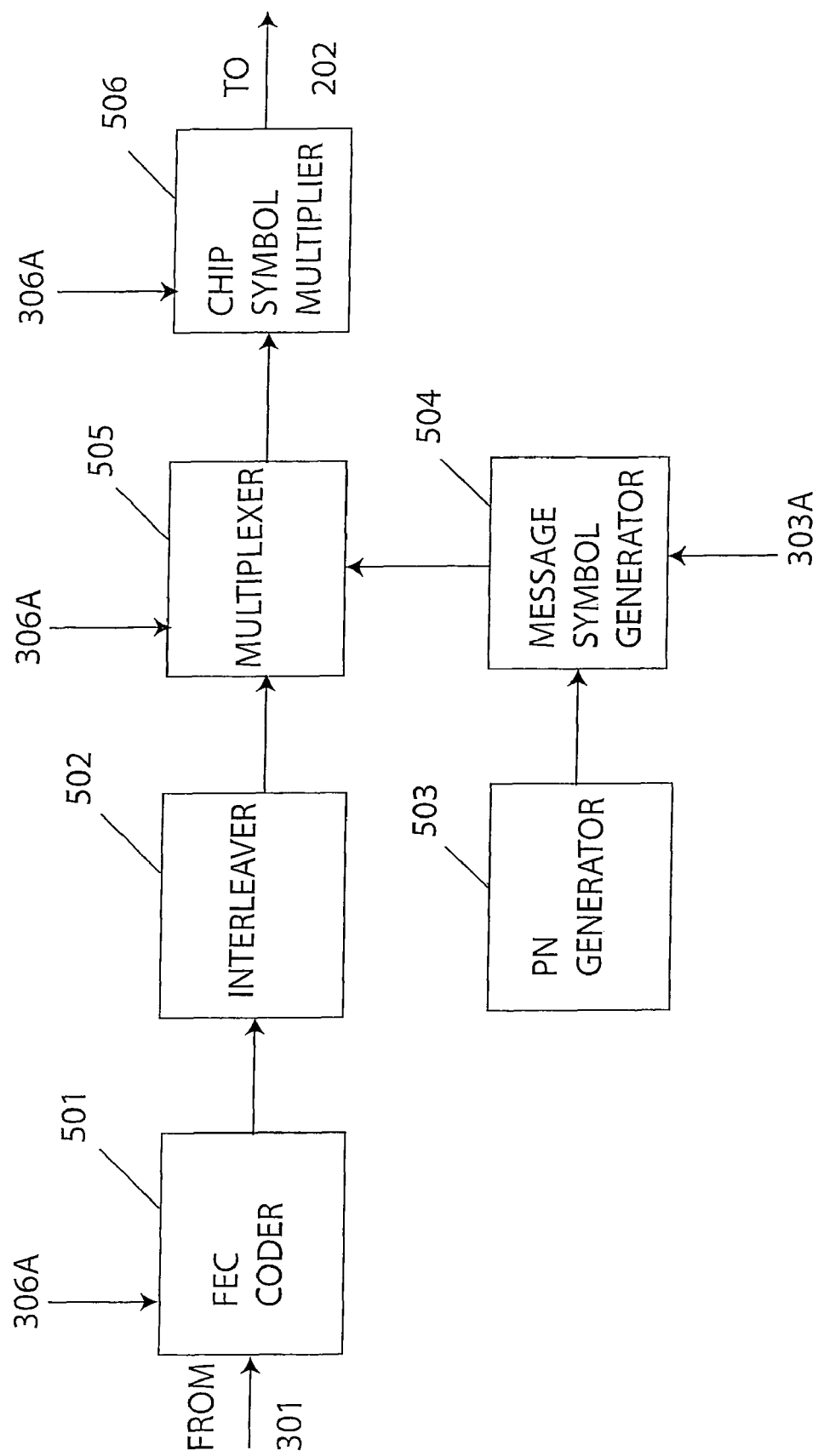
FIG. 5 is a block diagram of the direct sequence modulator in the transceiver of FIG. 3.

The preferred embodiment of the DS modulator 302 of FIG. 3 that would support adaptive data rates as given in the above example is shown in FIG. 5. Data from the multiplex buffer 301 is provided to FEC coder 501 for forward-error-correction coding. As an example, FEC coder 501 could include the convolutional codes K=7, r=⅓, with generator function 133,165,171 and the K=7, r=½ with generator function 133,171 and punctured versions of these convolutional codes to provide code rates greater than ½. Turbo codes are also commercially available over a suitable range of code rates and they provide superior bit-error rate performance relative to convolutional codes. Interleaver 502 distributes bits over the CDR frame. Interleavers are an intrinsic part of turbo code construction. A general discussion of interleavers is given in *Error-Correction Coding for Digital Communications*, G. C. Clark, Jr. and J. Bibb Cain, Plenium Press, New York, N. Y., June 1981. Multiplex 505 produces coded symbols from coded/interleaved bits and multiplexes the coded symbols with reference symbols to produce a sequence of symbols corresponding to the selected modulation format. For M-ary modulation there are $\log_2$ M bits per symbol. These multibit symbols are DS spread in chip symbol multiplier 506. The selected data rate in flow controller 306 is provided on 306A to FEC coder 501 to select the FEC code, to multiplexer 505 to select the multiplexing function, and to chip symbol multiplier 506 to select the number of chips/bit and the number of modulation amplitude/phases.

In the preferred embodiment PN generator 503 generates reference symbols that will be used for channel estimation purposes at the receiver. Also in the preferred embodiment feedback communication of message information is realized by overwriting a subset of the modulation symbols that contain reference values. In message symbol generator 504 a feedback message containing a remote-to-local quality message is received via 303a from message generator 303 of FIG. 3. The feedback message is encoded in message symbol generator 504 depending on the selected data rate mode into feedback symbols. A subset of the reference symbols received in message symbol generator 504 are then replaced with the feedback symbols. The reference symbols containing reference data and a possible feedback message are then time-division multiplexed with modulation symbols in multiplexer 505. At the receiver, a unique word detector is used to determine if there is a feedback message or not. Overwriting some of the reference symbols with feedback symbols exploits the fact that not all the data frames in the CDR frame require an equalization update.

When the transmit diversities preserve their orthogonality, e.g. frequency diversity and troposcatter polarization diversity, the adaptive receiver combines the $D_R$ diversity channels and mitigates the multipath effect to provide a combination of implicit diversity improvement and intersymbol interference reduction. An example of a receiver processing system to accomplish these functions is given in Adaptive Equalization where an optimum finite length DFE is described. Typical systems with orthogonal diversities include 2S/2F diversity where frequency band $f_1$ is transmitted from antenna 1 and frequency band $f_2$ is transmitted on frequency band $f_2$ on antenna 2 at the transmitter. In troposcatter systems two orthogonal transmit diversities can be realized with either a 4S configuration that uses two orthogonal polarized space diversity antennas or a dual angle/dual polarization (2A/2P) configuration with orthogonal polarized antenna feedhorns.

In a MIMO application the mutual interference produced from transmissions on multiple antennas within the same frequency band and polarization require receive diversities to aid in the reduction of receiver mutual interference. When nonorthogonal transmit diversities are employed to transmit independent data, there will be mutual interference at the receiver antenna ports. In *MMSE Equalization on Fading Dispersive Channels*, P. Monsen, IEEE Trans. Commun., pp. 5-12, January 1984, a minimum mean-square error (MMSE) decision-feedback equalizer (DFE) was used to reduce both multipath and mutual interference. In U.S. patent application Ser. No. 11/082,621, Technique for Adaptive Multiuser Equalization in Code Division Multiple Access Systems, filed 16 Mar. 2005, a MMSE DFE is described that equalizes K>1 Code Division Multiple Access (CDMA) users in a fading multipath environment. In a MIMO application in the present invention there may be different DS spreading codes used on transmit diversities at the lower data rate modes (N>1 in Table 1) that would contribute to reducing mutual interference at the receiver. In those data rate modes with no DS spreading gain (N=1 in Table 1), the mutual interference can be equalized by exploiting different multipath structures associated with each spatial path between antenna ports.

Equations for Optimum Finite-Length MIMO DFE

Accordingly a modification to the high data rate channel-estimating DFE described in Adaptive equalization is developed here in order to provide an equalization technique that additionally mitigates the mutual interference produced by the multipath when independent data is sent on nonorthogonal, i.e. MIMO, transmit diversity channels.

In Adaptive Equalization a received signal vector including contributions from $D_R$ receive diversities is defined in Eq. AE(Adaptive Equalization)-21 as $$\underline{r}_n = G\underline{a}_n + F\underline{\alpha}_n + \underline{u}_n \quad (4)$$

where $\underline{r}_n$ is a compound $T(P+1)D_R \times 1$ vector where T represents the number of samples per symbol, P+1 is the number of forward filter coefficients, and $D_R$ is the number of received diversities. Extending the definition of the information symbol vector defined in Eq. AE-12d to include independent data on $K_T \leq D_T$ nonorthogonal transmit diversities, one has $$\underline{a}_n = \{a^{(k)}_{n+p}, p=0,1,\ldots,P, k=0,1,\ldots,K_T-1\} \quad (5)$$

where as in Adaptive Equalization the above vector format uses a Do-Loop notation where the outer index is the outer Do-Loop and the inner index is the inner D0-Loop. The information symbol $a^{(k)}_{n+p}$ has been forward-error correction coded and interleaved and represents the (n+p)th symbol in time associated with transmission on the kth transmit diversity.

For a DFE the symbols to be estimated correspond to the nth symbol index so that $\underline{a}_n^{(k)}$ represents desired symbols (index n) and future interference symbols (index>n). Symbols that have already been estimated can be detected and used as past interference symbols. The past interference symbol vector is defined in Eq. AE-12a and generalized for this application as $$\underline{\alpha}_n = \{a^{(k)}_{n-q-1}, q=0,1,\ldots,P-1, k=0,1,\ldots,K_T-1\} \quad (6)$$

The vector $\underline{u}_n$ in Eq. (4) is a $T(P+1)D_R \times 1$ additive noise vector that is taken as white complex zero mean so that $$E(\underline{u}_n \underline{u}_n') = \sigma^2 I \quad (7)$$

In Adaptive Equalization the correlation effects of forward error correction coding are not included in the equalization process so as to separate the equalization and decoding functions. Because a constant signal constellation is used in Adaptive Equalization the covariance matrix of the information signal vector Eq. (5) is then the identity matrix. In the present invention, the transmit diversities uses data modes with different signal constellations. Thus for a particular configuration of transmit diversity signal constellations, the covariance matrix remains diagonal but with diagonal terms that depend on the respective data modes. Thus the symbol covariance matrix is $$E(\underline{a}_n \underline{a}_n') = D, D = \{d_i, i=j, 0 i \neq j\} \quad (8)$$

The matrices G and F which in Adaptive Equalization are given in Eqs. AE-22 and AE-23, respectively, must be modified for the DS modes when N>1 in Table1. For the kth transmit diversity, the selected data mode can be represented by a T×M fixed filter matrix $F^{(k)}(p)$ as defined in Eq. AE-5 where M is the number of channel coefficients, k is the transmit diversity, and p is the forward filter coefficient index. The forward filter processing requires the $T(P+1) \times M(P+1)$ compound matrix $$F_P^{(k)} = \{F^{(k)}(p-q), p=0,1,\ldots,P, q=0,1,P\} \quad (9a)$$

where p is the submatrix row index and q is the submatrix column index. As in Adaptive Equalization causality requires for each transmit diversity $$F_p^{(k)}(p)=0, p<0 \text{ and } p>P, k=0,1,\ldots K_T-1 \quad (9b)$$

Since the matrix $F^{(k)}(p)$ is zero for p<0 and p>P, the matrix $F^{(k)}(p)$ has nonzero submatrices only on thr lower diagonal. For use in defining past symbol interference there is a corresponding $T(P+1) \times PM$ matrix $$\overline{F}_P^{(k)} = \{F^{(k)}(p+q+1), p=0,1,\ldots,P, q=0,1,\ldots P-1\} \quad (9c)$$

The transmit diversity/receive diversity channel coefficient M×1 vector $\underline{h}^{(d,k)}$ defining the complex channel gains between the kth transmit diversity and the dth receive diversity, can be grouped into a $M(P+1) \times (P+1)$ matrix with only vector diagonal elements $$H_P^{(d,k)} = \begin{bmatrix} \underline{h}^{(d,k)} & & & 0 \\ & \underline{h}^{(d,k)} & & \\ & & \ddots & \\ 0 & & & \underline{h}^{(d,k)} \end{bmatrix} \quad (10)$$

With these definitions G and F can be defined by the dth row subblock and kth column subblock as $$G = \{F_P^{(k)} H_P^{(d,k)}, d=0,1,\ldots,D_R-1, k=0,1,\ldots,K_T-1\} \quad (11a)$$

$$F = \{\overline{F}_{P-1}^{(k)} H^{(d,k)}, d=0,1,\ldots,D_R-1, k=0,1,\ldots,K_T-1\} \quad (11b)$$

MIMO DFE Solution

The MMSE optimization problem for a finite length DFE with $K_T$ transmit diversities is $$\min_{\underline{g}_k} E(|\underline{g}_k' \underline{r}_n - a_n^{(k)}|^2), \; k=0,1,\ldots,K_T-1 \quad (12)$$

and using the orthogonality principle the solution must satisfy $$E((\underline{g}_n' \underline{r}_n - a_n^{(k)})^* \underline{r}_n) = 0 \quad (13a)$$

which using the definition from above results in $$(GDG' + \sigma^2 I)\underline{g}_k = GD\underline{e}_k \quad (13b)$$

where $\underline{e}_k$ is an identity vector with unity corresponding to the position of $a_n^{(k)}$ in $\underline{a}_n$ and zero otherwise.

The solution has a matched filter form that is independent of the transmit diversity, i.e.

$$\underline{g}_k = G'\underline{\gamma}_k \, k=0,1,\ldots,K_T-1 \tag{14}$$

so that $$\underline{x}_n = G'\underline{r}_n = \{x_{np}^{(k)}, p=0,1,\ldots,P, k=0,1,\ldots,K_T-1\} \tag{15}$$

is the output of a matched filter analogous to Eq. AE-25a. The $K_T$ forward filters are given by $$\underline{\gamma}_k = (G'G + \sigma^2 D^{-1})^{-1} \underline{e}_k \tag{16}$$

which differs from Eq. AE-34 by the noise weighting matrix $D^{-1}$. It can be shown that the minimum mean square error (MMSE) is equal to the zeroth order coefficient of the forward filter ($\gamma_{0k}$ in Eq. 16) scaled by the additive noise variance $\sigma^2$ and divided by the desired symbol energy $d_0$. There are $K_T$ backward filters $\underline{b}_k, k=0,1,\ldots,K_T-1$ that form a dot product with a detected version of $\underline{a}_n$ denoted as $\hat{\underline{a}}_n$. When there are no decision errors there is perfect cancellation of past symbol interference if $$\underline{b}_k = F'G\underline{\gamma}_k, k=0,1,\ldots K_T-1 \tag{17}$$

The forward (Eq. 16) and backward filter (Eq. 17) coefficients for the decision-feedback equalizer are computed in DFE calculator 33 in FIG. 3 of Adaptive Equalization.

The matched filter computation Eq. (15) dominates the DFE complexity. As in Adaptive Equalization this computation is accomplished as shown in FIG. 5 of Adaptive Equalization with a fixed filter correlator, symbol combiner, and channel matched filter. The fixed filter correlator is analogous to Eq. AE-17 but requires a dependence on the transmit diversity selected data rate mode. For subvectors $\underline{r}_n^{(d)}$ representing the $D_R$ diversities in the vector $\underline{r}_n$, the fixed filter correlator output is the M vector $$\underline{q}_{n,p}^{(d,k)} = F^{(k)'}(p) \underline{r}_n^{(d)} \, p=0,1,\ldots P$$

$$d=0,1,\ldots,D_R-1 \tag{18}$$

$$k=0,1,\ldots,K_T-1$$

In the present invention the symbol length T is held constant and lower data rate modes are realized with DS spreading where the chip symbol length is T seconds and the data symbol length is NT seconds. A finite duration spectrum control filter with impulse response f(t) is used to maintain the same bandwidth for all data rate modes. The fixed filter correlator output in Eq. (18) can be generated by first correlating the received signal and the spectrum control impulse response analogous to Eq. AE-19. For a data symbol period of NT seconds, one has $$\tilde{q}_{npm}^{(d)} = \int_0^T f(t - mNT/Q + pNT) r^{(d)}(t + nNT) dt \tag{19}$$

For the spread spectrum modes where N>1, the transmitted data pulse for the kth transmit diversity is $$p^{(k)}(t) = \sum_{i=0}^{N-1} c_i^{(k)} f(t - iT) \tag{20}$$

where $c_i^{(k)}$ are the complex DS spreading values for the kth transmit diversity. One can then show that from the received signal correlation with the spectrum control impulse response (Eq. 19), the fixed filter correlator outputs in Eq. (18) have components $$q_{npm}^{(d,k)} = \sum_{i=0}^{N-1} \sum_{j=0}^{N-1} c_j^{(k)} \tilde{q}_{n,p,mN+j-i} \tag{21}$$

The symbol combiner calculation is accomplished with an iteration in order to reduce complexity. The iteration is given by Eq. AE-16 but must be performed for each of the $D_R K_T$ combinations resulting in subvector outputs $\underline{\xi}_{np}^{(d,k)}$. The channel matched filter combines over the $D_R$ diversity channels analogous to Eq. AE-15b to produce the $K_T(P+1)$ components $\underline{x}_n$ in Eq. (12), viz., $$x_{np}^{(k)} = \sum_{d=0}^{D_R-1} \underline{h}^{(d,k)'} \underline{\xi}_{np}^{(d,k)}, \, p=0,1,\ldots P, k=0,1,\ldots K_T-1 \tag{22}$$

Note that in Adaptive Equalization where $K_T$ components are Space-Time Block Code combined in Eq. AE-13c whereas in the MIMO DFE these components are not combined in order to mitigate mutual interference between the transmit diversity channels.

Figure 6:
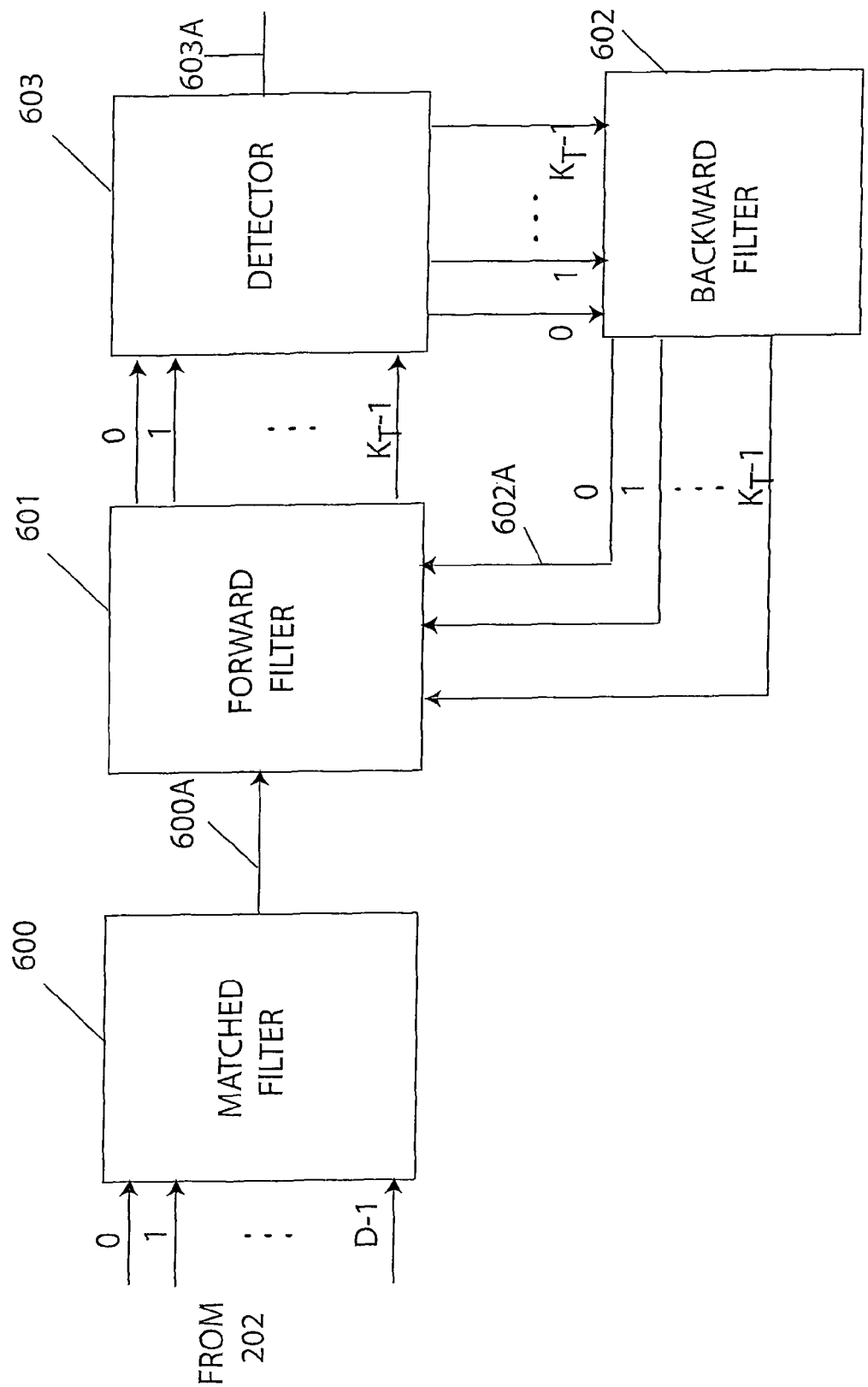
FIG. 6 is a block diagram of the decision-feedback equalizer in the message detector of FIG. 3.

The MIMO DFE is used in message detector 305 to process $D_R$ received diversity signals provided from down-converter 300 to produce $K_T$ information symbol estimates for each of $N_S$ symbol intervals within a data frame. It is assumed that time synchronization has already occurred and symbol epochs $n=0,1,\ldots,N_S-1$ at the receiver associated with the earliest multipath return of respective symbols have been identified. The MIMO DFE is shown in FIG. 6 to include a feed-forward filter comprising matched filter 600 and forward filter 601, a backward filter 602, and symbol detector 603. As in Adaptive Equalization the filters are realized as vector operators rather than tapped-delay-line filters with stationary inputs. Consequently the signal outputs from matched filter 600 are nonstationary, i.e. signal components do not have second order statistics that depend only on their index difference. Matched filter 600 combines signal components according to Eq. 12 resulting in a signal-to-noise ratio enhancement. Matched filter 600, however, also increases intersymbol interference (ISI) from the desired transmit diversity and modifies the interfering transmit diversity intersymbol interference (IISI). The ISI and IISI are subsequently processed in $K_T$ branch forward filter 601 and $K_T$ branch backward filter 602 using filter coefficients given by Eqs. 13 and 14, respectively. These coefficients are functions of $K_T D_R$ channel vectors each with M coefficients that are determined by channel estimation as described in Adaptive Equalization. The channel estimation uses outputs $\underline{\xi}_{np}^{(d,k)}$ from the symbol combiner subsequently passed on 305A to quality estimator 302 where correlation with reference sequences generates coarse channel estimates. These coarse estimates are then refined as explained in Adaptive Equalization to obtain the channel estimates. In the MIMO DFE The ISI and IISI are partitioned into symbol interference due to symbols not yet detected in detector 603, i.e. future ISI and present and future IISI, and symbols that have been detected in detector 603, i.e. past ISI and past IISI. The forward filter 601 minimizes the future ISI and present and future IISI. The backward filter 602 generates a past interference signal for past ISI and past IISI cancellation in forward filter 602.

Figure 7:
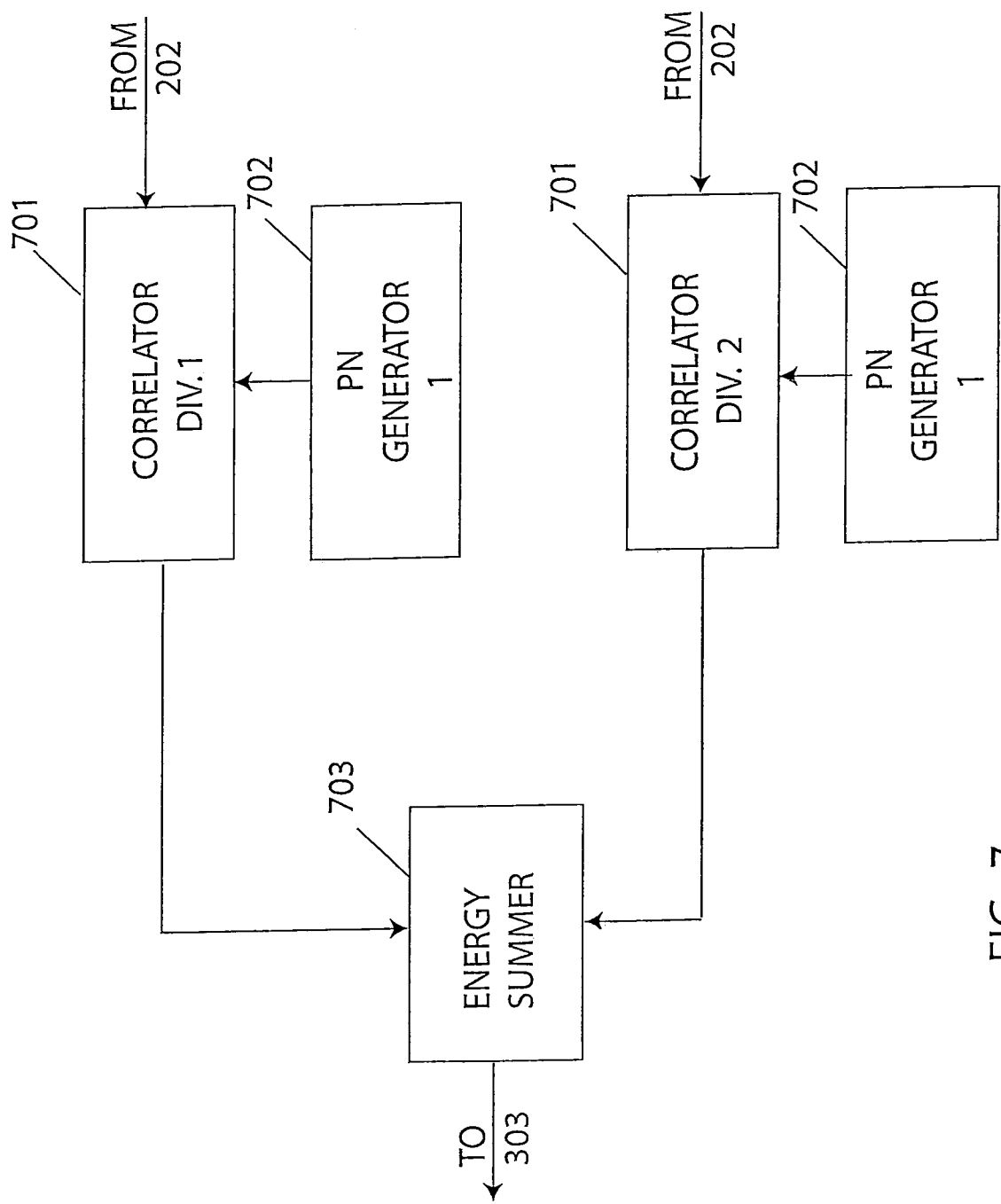
FIG. 7 is a block diagram of a dual receive-diversity quality estimator in the transceiver of FIG. 3.

FIG. 7 illustrates the operation of the quality estimator for a single transmit diversity/dual receiver diversity example. A correlator 701 correlates the received signal on received diversity,d, d=1,2 with the transmitted reference symbols associated with the transmit diversity generated locally by PN generator 702. The correlator 701 also provides additional processing to reduce sidelobes as described in Adaptive Equalization. The output of correlator 701 contains samples of the estimated channel impulse response. The total energy is computed in energy summer 703 as the sum of the magnitude square of a set of the estimated channel impulse samples. When transmit diversities are orthogonal the set contains all the samples because all the energy is effectively used in the DFE. When transmit diversities are not orthogonal the set of samples excludes samples that contribute to interference reduction. In a preferred symmetrical embodiment where $D_T = D_R$ energy summer 703 computes the received diversity energy associated with each received diversity and selects the largest received diversity energy as the quality measure component. Energy summer 703 may also include AGC and noise level values generated in the receiver portion (not shown) of the transceiver for purposes of modifying the output to the message generator 303. In an alternative embodiment for generating the quality measure component, the zeroth order coefficient of the forward filter ($\gamma_{0k}$ in Eq. 16) is scaled by the additive noise variance divided by the desired symbol energy to produce the calculated MMSE value for the associated transmit diversity. The use of the forward filter coefficient as a quality measure takes into account the degradation associated with MIMO cancellation in the DFE. PN generators 702 are associated with particular transmit diversities. Where transmit diversities are not orthogonal, for example in MIMO systems, it is desirable to use orthogonal or quasi-orthogonal PN generators for each transmit diversity.

The potential data throughput improvement for the present invention can be accurately estimated by considering an ideal adaptive data rate tropospheric scatter system with perfect feedback communications. In this ideal model the feedback communications is instantaneous (there is no round trip delay) and perfectly reliable. The data rate at the transmitter is then instantaneously adapted to the channel conditions so as to maintain a fixed quality level as measured by an outage probability. The data rate throughout including both short term and long term effects is compared to the data rate throughput for a conventional system with a fixed trunk line digital data input. The conventional tropospheric scatter system has a fixed data rate for the trunk line that depends on tropospheric scatter prediction techniques. For IP traffic, the comparison will use outage probability and not average bit error rate as the quality criterion.

The present invention uses reference symbols for the feedback message containing link quality information and also for transmission of data rate change information. In most applications the information rate is much greater than the reference rate and the round trip delay is short compared to the channel corridor time. For these two conditions there is only a small difference in the average data rate between the practical system and the ideal data rate adaptation system.

Table 1 provided an example of data rate modes that can be implemented in the present invention. For a conventional quadruple diversity tropospheric scatter link with dual space/dual frequency (2S/2F) configuration, the link is symmetrical with two antennas at each end and each antenna has a duplexer and power amplifier. Each antenna and power amplifier serves as a transmit frequency diversity. For receiving the outputs of the two antennas on a common frequency are coherently combined and demodulated. Thus the receiver output includes two independent data streams, one for each transmit frequency diversity. Because of the generally concave relationship between the data rate and required signal-to-noise ratio, it is preferable to adapt the data rate independently on the two transmit diversities. The instantaneous data rate is the sum of the two transmit frequency diversity data rates. In the 2S/2F configuration the frequency channels are orthogonal so there is no interference between the transmit diversities with independent data. In a 4S configuration the orthogonal polarizations are preserved in the troposcatter fading channel so independent data can also be sent on the two transmit diversities with an effective bandwidth savings of a factor of two relative to the 2S/2F configuration.

For one of the two received frequencies or polarizations and for a received signal power $P_d$ on receive antenna d, d=1,2, a noise spectral density $N_0$, and a bandwidth W, the normalized signal-to-noise ratio x is $P/N_0W$ where $P=P_1+P_2$. Table 1 provides a relationship expressed as a series of step functions between the normalized information rate r=R/W and y=$E_b/N_0$ where R is the data rate and $E_b$ is the received energy per bit.

Using Eq. (2) one has $$y = \frac{E_b}{N_0} \qquad (23)$$
$$= \frac{P}{N_0 R}$$
$$= \frac{P}{N_0 W} \frac{W}{R}$$
$$= x/r$$

The normalized signal-to-noise ratio is also represented as a series of step functions according to the relationship $$x(r_i) = r_i y(r_i) \; i=0,1,\ldots,I \qquad (24)$$

where $y(r_i)$ is the step function of column 4 and $x(r_i)$ is the step function of column 5 of Table 1. In the present invention, the data rate is decreased from mode i to mode i−1, i=1, 2, ..., I, i=0 is the lowest rate mode, when the normalized signal-to-noise ratio is detected to fall below $x(r_i)$ of column 5. When the maximum spread spectrum gain is 32, the maximum data rate mode in Table 1 is I=13.

For ideal data rate adaptation, r is instantaneously adjusted to match the inverse step function r(x) corresponding to Eq. (24). The average data rate for independent data transmissions on $D_T$ orthogonal transmit diversity channels with $D_R$ receive diversity channels is $$\bar{r}(\bar{x}) = D_T \int_0^\infty r(D_R x) p_{D_R}(x|\bar{x}) dx \qquad (25)$$

where $P_{D_R}(x|\bar{x})$ is the probability density function (PDF) of the total received signal-to-noise ratio in a $D_R$ th order receive diversity system with mean signal-to-nose ratio x̄ per diversity. The PDF should contain the effects of implicit diversity to accurately assess the improvement in average data rate with multipath. This analysis would use the implicit diversity eigenvalue decomposition described in *Theoretical and Measured Performance of a DFE Modem on a Fading Multipath Channel*, P. Monsen, IEEE Trans. On Comm., October 1977. The analysis should also include the effects of increased ISI with higher order signal constellations. A simpler analysis that provides a first order estimate corresponds to the no implicit diversity limit, i.e. flat frequency fading. In this analysis there is no improvement due to implicit diversity and no degradation due to ISI. Because these effects approximately offset each other this estimate is fairly accurate. For flat frequency fading the PDF for $D_R$ th receive diversity is $$p_{D_R}(x|\bar{x}) = \frac{1/\bar{x}}{(D_R-1)!}(x|\bar{x})^{D_R-1}\exp(-x/\bar{x}) \quad (26)$$

For a $D_T$ transmit diversity configuration that preserves orthogonality and $D_T$ independent data transmissions, the normalized Shannon capacity is $$c(x)=D_T\log_2(1+x) \quad (27)$$

and the average capacity with $D_R$ receive diversities in the ideal data rate adaptation model is $$\bar{c}(\bar{x}) = D_T\int_0^\infty \log_2(1+x)p_{D_R}(x|\bar{x})dx \quad (28)$$

Figure 8:
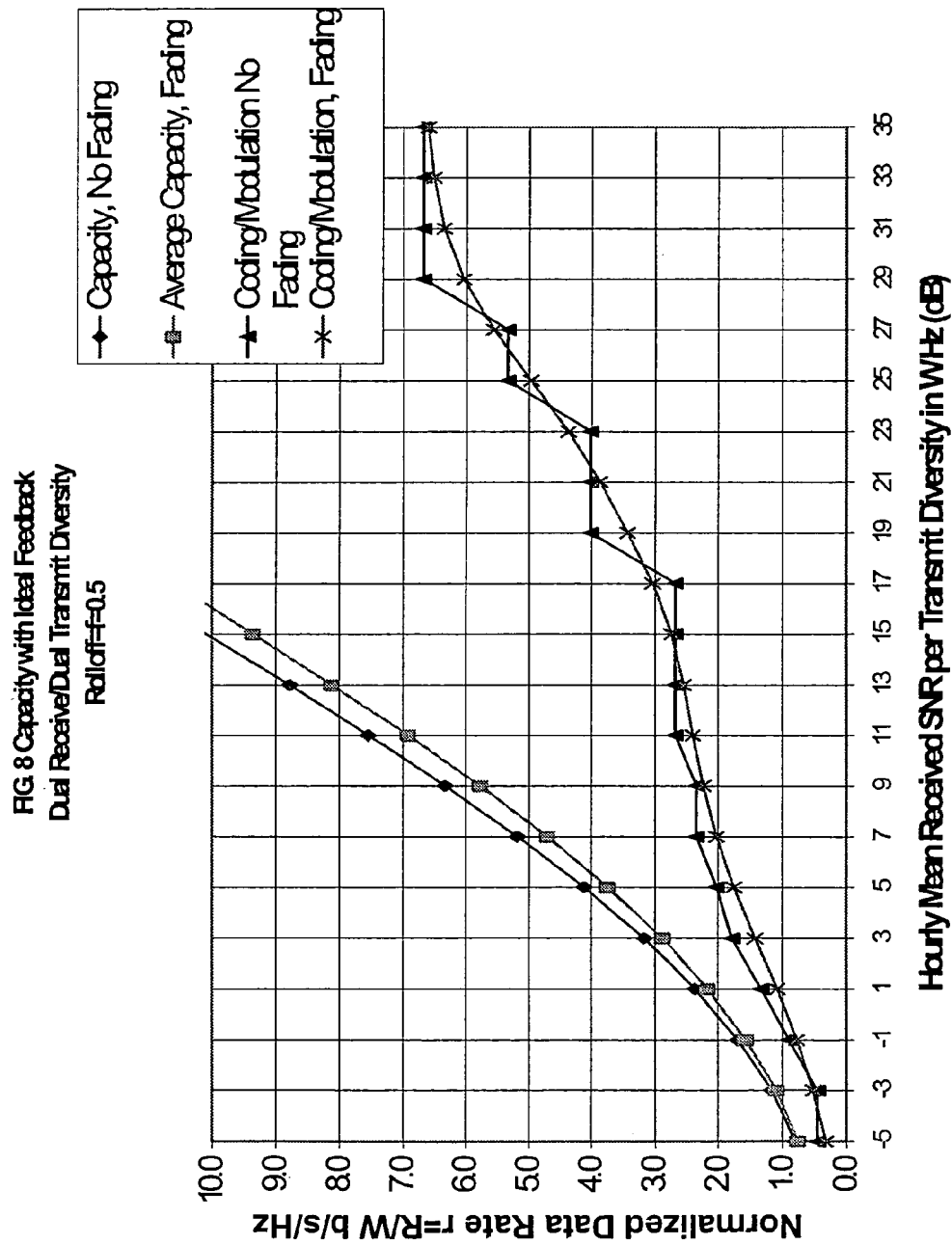
FIG. 8 is a graph of average Shannon capacity and average data rate in the communication system of FIG. 1.

For the D=4 2S/2F configuration there are two transmit diversities $D_T$=2 and two receive diversities $D_R$=2. In FIG. 8 the first order estimate results for $\bar{c}$ and $\bar{r}$ are given for the 2S/2F configuration as a function of the received average hourly SNR per Hz per transmit diversity ($D_R\bar{x}$)in dB. For comparison purposes the nonfading results for c and r are also shown. Note that the fading loss is small for capacity codes as well as practical codes. Since the practical nonfading rate r curve has step functions it is not concave versus SNR/Hz and the average rate can actually exceed the nonfading rate.

FIG. 8 can be used to compare the average data rate realized with the present invention under conditions of ideal feedback with the 12.6 Mb/s system in MDTS that required a normalized hourly mean SNR/Hz/transmit diversity of 13.2 dB (see example after Eq. 2). For the conventional troposcatter design goal of 99.9% availability, the 99.9% data rate achieved in the feedback system is 2.56 W or 38.4 Mb/s. For the 367 km link example the data rate in the feedback system averaged over the year corresponds to an hourly mean SNR/Hz/transmit diversity of 13.2+18=31.2 dB. From FIG. 8 the annual average data rate is 6.37 W or 95.55 Mb/s, a factor 7.58 times greater than the MDTS system. The feedback system is also not power limited so that larger bandwidths can be exploited to further increase the average data rate. In a 54 MHz bandwidth system described earlier, the annual average data rate becomes 344 Mb/s, an improvement factor of 27.3 over the MDTS system. These results can be further improved by doubling the number of transmit diversities in a MIMO configuration wherein for each antenna port two orthogonal frequency/polarization signals are transmitted instead of one. Such configurations may be denoted as 2S/4F where 2 MIMO signals are sent in each of two frequency bands or 2S/4P where 2 MIMO signals are sent in each of two orthogonal polarizations. In a flat fading analysis in *Some Results and Insights on the Performance Gains of MIMO Systems*, S. Catreux, et. al., IEEE Select. Areas Commun., pp. 839-847, June 2003, a 2×2 MMSE MIMO system at a 15 db SNR increases the median data rate in each orthogonal transmit diversity by approximately an additional 24% relative to an equal transmit power single antenna port system with dual receive diversity. This data rate increase with the MIMO system requires two power amplifiers with ½ the rated output power rather than one power amplifier per antenna port and a more complex DFE demodulator.

Troposcatter systems have not been commercially competitive with satellite systems because the former generally requires larger power amplifiers and multiple antennas. The latter also has historically provided a larger data rate capability. In Adaptive Equalization a single antenna troposcatter system using angle diversity was described as a technique to approach satellite system performance. In the Adaptive Equalization solution improved performance is realized with transmit angle diversity using space-time block coding and bandwidth expansion techniques to increase implicit diversity. In the present invention higher data rates are achieved without bandwidth expansion by adapting the data rate on each transmit diversity. Larger bandwidth when available can be used to further increase the data rate as illustrated in the 54 MHz example discussed earlier with respect to FIG. 8.

In particular a preferred single antenna embodiment of the present invention for a duplex troposcatter link employs symmetrical link terminals with an antenna reflector with multiple feedhorns. In a preferred configuration the feedhorns are stacked vertically so as to produce vertically splayed beams. Vertical displacement is superior to horizontal displacement because the squint loss between beam pairs is smaller for vertically splayed beams in troposcatter applications. With vertical displaced feedhorns and an antenna reflector the lowest beam, i.e., main beam, is produced by the top feedhorn in the vertical array. The main beam is normally aimed at the horizon and elevated beams have an increasing squint loss because of an associated larger scattering angle. Because of the duplex link character an antenna/duplexer 202 as shown in FIG. 2 is required at each link terminal. The antenna/duplexer in this single antenna embodiment includes the antenna reflector with multiple feedhorns, feedhorn duplexers for each feedhorn, and a power amplifier on the transmit side of each of the feedhorn duplexers. Each feedhorn provides a transmit diversity for transmission of independent data and it also provides a receive diversity for recovering digital data information transmitted from the remote terminal. The transmit diversities are preferably separated by using orthogonal polarizations rather than different frequency bands. Polarization discrimination has the advantage that only half the total bandwidth is required relative to frequency discrimination. This choice exploits the small scattering angle phenomenon in troposcatter propagation where polarization orthogonality is preserved in the fading multipath channel. Note that the transmit and receive frequency bands at a terminal end must be distinct so that the duplexer can extract the weaker receive signal from the stronger transmit signal.

Because of the squint loss increase with increasing beam angle, a practical realization of an adaptive data rate angle diversity system would use two vertically configured cross-polarized feedhorns with minimum beam separation. Because of design constraints this beam separation is typically about one beamwidth. In this dual angle, dual polarization (2A/2P) diversity troposcatter system, independent data is modulated, amplified, and then transmitted on a separate orthogonal polarization in each of the two feedhorns. An adaptive receiver, for example the technique described in Adaptive Equalization, is used to combine the two receiver diversities associated with the two receiver feedhorns for each of the two orthogonal transmit diversity paths. This 2A/2P system also could be augmented in a MIMO configuration wherein for each antenna port two orthogonal polarization signals are transmitted instead of one. In this MIMO 2A/4P system two CE/DFE systems as described herein, one for each polarization could be used to recover the digital data information allocated to the four transmit diversities.

In the local terminal a quality measure for each of the remote terminal transmit diversities with local terminal dual receive diversity combining is generated in quality estimator 302 in the transceiver of FIG. 3 in this dual angle troposcatter system. Message generator 303 prepares feedback messages associated with the remote-to-local transmit diversities and forwards these messages to direct-sequence modulator 304 for transmission. Message detector 305 at the local terminal recovers the feedback messages sent from the remote terminal. Flow controller 306 uses the recovered transmit diversity quality measures to select the data rate mode for each of the transmit diversities in the next constant data rate (CDR) interval. As an example a practical set of data rate modes for data rate adaptation has been given in Table 1. Digital data information from the multiplex buffer 301 is error-corrected coded, interleaved, and modulated in direct sequence modulator 304 for each of the two transmit diversities. Because of the terminal symmetry in this 2A/2F troposcatter system, the functions at the local and remote terminals are identical.

In the preferred embodiment in the single antenna angle diversity system, reference data is transmitted and is used both as an aid in demodulation and as a carrier for the feedback messages. In alternative embodiments the reference data can be omitted and blind equalization, such as described in MDTS, can be used to adapt the receiver. In the absence of reference data, the feedback messages can be sent in a separate subchannel or by time-division multiplexing them with the coded/interleaved digital data information.

The same analysis has been used as for FIG. 8 but for the single antenna 2A/2P diversity system with a single power amplifier on each feedhorn. A squint loss is assumed of 3 dB which is typical of angle diversity systems with a one beamwidth vertical squint angle. For the 367 km link example the average annual data rate was calculated in the ideal feedback system corresponding to an hourly mean SNR/Hz/transmit diversity of 13.2+18=31.2 dB, i.e. a 99.9% availability link design. In the 2A/2P angle diversity system the average rate drops to 5.84 W compared to 6.37 W for the previously analyzed two antenna 2S/2F system. Thus the single antenna angle diversity system delivers an average annual data rate of 87.6 Mb/s on the example 367 km link achieving 91.6% of the capacity of the more costly two antenna, two frequency system. The MIMO 2A/4P configuration could be used to further increase the data rate or for the same data rate reduce system parameters such as power amplifier size or antenna diameter.

From this 367 km troposcatter angle diversity example at 2.7 Ghz, one can approximately scale the parameters to a Ku band application to obtain an average annual data rate estimate. Table 2 summarizes practical parameters for the Ku band system and the scaled gains and losses from the S-band 367 km example.

TABLE 2

Comparison of S-band and Ku Band System

| Parameter | S-band System | Ku-band System | Loss (dB) |
| --- | --- | --- | --- |
| Frequency (GHz) | 2.7 | 14.85 | 22.2 |
| Antenna Diameter (m) | 8.5 | 3.1 | −6.0 |
| Distance (km) | 367 | 240 | −3.7 |
| Transmit Power (kw) | 1.6 | 0.5 | 5.1 |

Total Loss = 17.6

For an increase in carrier frequency of a factor of 5.5 it is reasonable to expect that 5.5 times as much bandwidth would be available so that W becomes 82.5 MHz at Ku-band. The hourly mean SNR/Hz/transmit diversity drops from 31.2 dB to 13.6 dB and a calculation from a FIG. 8 analysis yields an average annual data rate of 2.37 W, i.e. a data rate of 195.5 Mb/s for a single antenna Ku-band adaptive data rate system. Here one observes that in contrast to existing systems in the present invention the bandwidth scaling is more important than the losses associated with frequency scaling as a higher data rate is achieved in the Ku-band system than in the S-band system.

What is claimed is:

1. In a duplex radio link wherein a local terminal and a remote terminal each transmits digital data information along with jointly-known reference data over a plurality of fading dispersive channels, that include a plurality of transmit diversity channels, producing local and remote received signals at the respective terminals and wherein at the local terminal the digital data information is generated from a data interface in the form of data packets, a method of operating the local and remote terminals comprising the steps of:

modulating at the local terminal, for transmission on respective transmit diversity channels at a constant symbol rate and over a predetermined constant data rate interval, independent digital data information and the jointly-known reference data, in accordance with a selected respective data rate mode that is a function of direct sequence spreading gain, error correction code rate, and signal constellation type;

calculating at the remote terminal from the jointly-known reference data and the remote received signals a link quality measure;

transmitting at the remote terminal a feedback message containing the link quality measure;

recovering at the local terminal from the local received signals the link quality measure contained in the feedback message transmitted from the remote terminal;

controlling at the local terminal an arrival rate from the data interface of data packets as a function of the link quality measure and the current data packet arrival rate;

selecting at the local terminal the respective data rate mode for the next constant data rate interval as a function of the data packet arrival rate and the link quality measure.

2. The method of claim 1 wherein the transmit diversity channels include two orthogonal-polarized channels.

3. The method of claim 1 wherein the transmitting step further includes replacing symbols used for transmitting the jointly-known reference data with symbols associated with the feedback message.

4. The method of claim 1 wherein the calculating step further includes the steps of:
  correlating the jointly-known reference data with each of the remote received signals associated with a respective transmit diversity channel to provide channel estimates; and
  summing the magnitude-squared channel estimates to produce said link quality measure.

5. The method of claim 1 wherein the calculating step further includes the steps of:
  correlating the jointly-known reference data with each of the remote received signals associated with a respective transmit diversity channel to provide channel estimates;
  generating, for a decision-feedback equalizer, forward filter and backward filter coefficients that depend on the channel estimates and the signal constellation type, and
  computing said link quality measure that depends on the lowest order coefficient of the forward filter.

6. For use in a duplex radio link, wherein a local terminal and a remote terminal each transmits digital data information, that is generated from a data interface in the form of data packets, and jointly-known reference data over a plurality of fading dispersive channels, a transceiver apparatus at the local terminal, that processes the jointly-known reference data and received signals associated with the plurality of fading dispersive channels to recover digital data information transmitted from the remote terminal, comprising:
  a multiplex buffer for accepting the data packets from the data interface and storing the digital data information;
  a quality estimator for computing a receiver link quality measure from the jointly-known reference data and the received signals;
  a message generator for producing a feedback message containing the receiver link quality measure;
  a direct-sequence modulator for modulating, at a constant symbol rate and over a predetermined constant data rate interval, the feedback message, the jointly-known reference data, and the digital data information stored in the multiplex buffer, in accordance with a selected data rate mode that is a function of direct sequence spreading gain, error correction code rate, and signal constellation type;
  a message detector for recovering from the received signals a remote-terminal receiver link quality measure that has been computed by a respective quality estimator at the remote terminal and included in a remote-terminal feedback message produced in a respective message generator at the remote terminal and transmitted from the remote terminal along with the jointly-known reference data and the digital data information; and
  a flow controller that uses the remote-terminal link quality measure for selecting the data rate mode for the next constant data rate interval.

7. The transceiver apparatus according to claim 6 wherein the direct sequence modulator further includes producing feedback symbols associated with the feedback message and replacing symbols associated with the jointly-known reference data with the feedback symbols.

8. The transceiver apparatus according to claim 6 wherein the quality estimator further includes:
  a correlator for correlating the jointly-known reference data and the received signals to provide the channel estimates; and
  an energy summer for computing the receiver link quality measure that depends on the sum of the magnitude-squared channel estimates.

9. The transceiver apparatus according to claim 6 wherein the quality estimator further includes:
  correlator for correlating the jointly-known reference data and the received signals to provide the channel estimates;
  a decision-feedback equalizer with forward filter coefficients that depend on the channel estimates and signal constellation type; and the receiver link quality measure depends on the lowest order forward filter coefficient.

10. A method for operating a tropospheric scatter radio link, wherein at a local terminal with a single antenna including a plurality of local terminal feedhorns, digital data information is transmitted to a remote terminal with a single antenna including a plurality of remote terminal feedhorns and at the local terminal received signals are processed to recover digital data information transmitted from the remote terminal, comprising:
  at the transmitting terminal the steps of:
    modulating the digital data information into a plurality of independent modulation signals each with a respective data rate and each associated with a respective local terminal feedhorn;
    amplifying a respective modulation signal for transmission from the associated local terminal feedhorn; and
  at the remote terminal the steps of:
    receiving local terminal feedhorn signals on each of the remote terminal feedhorns;
    computing one or more local terminal feedhorn quality measures from the local terminal feedhorn signals;
    transmitting said quality measures toward the local terminal; and
  at the local terminal the additional steps of:
    recovering from the received signals a local terminal feedhorn quality measure;
    adapting a respective data rate in accordance with the recovered local terminal feedhorn quality measure.

11. The method of claim 10 wherein the terminal feedhorns are vertically stacked and the amplifying step at the transmitting terminal further includes transmission on two orthogonal-polarized feedhorns.

12. The method of claim 10 wherein the computing step further includes the steps of:
  estimating a plurality of local-remote channel responses each associated with a channel path between a local terminal feedhorn and remote terminal feedhorn;
  combining a plurality of channel responses having the same local terminal feedhorn to provide the local terminal feedhorn quality measure.

13. For use in a tropospheric scatter radio link wherein digital data information is transmitted to a remote terminal with a single antenna including a plurality of remote terminal feedhorns, a local terminal apparatus with a single antenna including a plurality of local terminal feedhorns each with received signals from the remote terminal comprising:
  a direct sequence modulator for converting the digital data information into a plurality of independent modulation signals each with an associated data rate and associated with a local terminal feedhorn;
  an amplifier group for amplifying each independent modulation signal for transmission from the associated local terminal feedhorn;
  a quality estimator for estimating from the received signals a plurality of receiver quality measures each associated with a remote terminal feedhorn;

a message generator for encoding the plurality of receiver quality measures into a feedback message for transmission toward the remote terminal;

a message detector for recovering from the received signals a plurality of remote-terminal receiver link quality measures, that have been computed by a respective quality estimator at the remote terminal and included in a remote-terminal feedback message produced in a respective message generator at the remote terminal and transmitted from the remote terminal along with the jointly-known reference data and the digital data information, and each of the remote-terminal receiver link quality measures is associated with a local terminal feedhorn; and a flow controller for adapting said data rate in accordance with the associated local-terminal feedhorn and the associated remote-terminal receiver link quality measure.

14. The local terminal apparatus according to claim 13 wherein the quality estimator further includes:

means for estimating a plurality of remote-local channel responses each associated with a channel path from a remote terminal feedhorn to a local terminal feedhorn;

means for combining a plurality of channel responses having the same remote terminal feedhorn to provide the associated link quality measure.

* * * * *